US012650609B2

(12) United States Patent
　　Shirakura

(10) Patent No.: US 12,650,609 B2
(45) Date of Patent: Jun. 9, 2026

(54) OPTICAL DEFLECTION DEVICE, IMAGE DISPLAY DEVICE, SIGNAL DEVICE, IMAGE RECORDING MEDIUM, AND IMAGE REPRODUCTION METHOD

(71) Applicant: ARTIENCE LAB INC., Chiba (JP)

(72) Inventor: Akira Shirakura, Chiba (JP)

(73) Assignee: ARTIENCE LAB INC., Chiba (JP)

( * ) Notice: Subject to any disclaimer, the term of this patent is extended or adjusted under 35 U.S.C. 154(b) by 816 days.

(21) Appl. No.: 16/617,043

(22) PCT Filed: Apr. 25, 2018

(86) PCT No.: PCT/JP2018/016747
§ 371 (c)(1),
(2) Date: Mar. 21, 2021

(87) PCT Pub. No.: WO2018/221091
PCT Pub. Date: Dec. 6, 2018

(65) Prior Publication Data
US 2021/0318658 A1　　Oct. 14, 2021

(30) Foreign Application Priority Data
May 29, 2017　(JP) ................................. 2017-105948

(51) Int. Cl.
*F21V 8/00*　　　(2006.01)
*G02B 5/18*　　　(2006.01)
(Continued)

(52) U.S. Cl.
CPC ....... *G02B 27/4272* (2013.01); *G02B 5/1819* (2013.01); *G02B 27/4205* (2013.01);
(Continued)

(58) Field of Classification Search
CPC .............. G02B 5/1819; G02B 27/4205; G02B 27/4272; G02B 2027/0174; G03H 1/0005;
(Continued)

(56) References Cited

U.S. PATENT DOCUMENTS 5,682,255 A　　10/1997　Friesem
6,018,403 A　*　1/2000　Shirakura ............ G03H 1/0408
　　　　　　　　　　　　　　　　　　　359/23

(Continued)

FOREIGN PATENT DOCUMENTS

JP　　　　3-297003 A　　12/1991
JP　　　　8-507879 A　　8/1996
(Continued)

*Primary Examiner* — Audrey Y Chang
(74) *Attorney, Agent, or Firm* — Apex Juris, pllc; Tracy M Heims

(57) ABSTRACT

This optical deflection device has a light source light-emitting units, a transparent medium, and a holographic diffraction grating disposed on the transparent medium without air interposed therebetween, the optical deflection device being configured so that divergent rays incident on the transparent medium from the light source light-emitting units are made parallel by the holographic diffraction grating and propagated at a critical angle in the transparent medium. By combining this optical deflection device with an edge-lit-reproduction-type hologram, it is possible to realize a low-cost, compact image display device, signal device, or the like.

5 Claims, 16 Drawing Sheets

(51) Int. Cl.

| | | |
|---|---|---|
| *G02B 27/42* | (2006.01) | |
| *G03H 1/00* | (2006.01) | |
| *G03H 1/02* | (2006.01) | |

(52) U.S. Cl.
CPC ......... *G03H 1/0005* (2013.01); *G03H 1/0248* (2013.01); *G03H 2001/0088* (2013.01); *G03H 2001/0228* (2013.01)

(58) Field of Classification Search
CPC ......... G03H 1/0248; G03H 2001/0088; G03H 2001/2226; G03H 2001/0228
USPC ...................................................... 359/15, 34
See application file for complete search history.

(56) References Cited

U.S. PATENT DOCUMENTS

| | | | | |
|---|---|---|---|---|
| 2005/0094404 A1* | 5/2005 | Sinesi | .................... | G08G 1/095 |
| | | | | 362/322 |
| 2007/0098326 A1* | 5/2007 | Kuo | ..................... | H04N 9/3141 |
| | | | | 348/E5.143 |

| | | | | |
|---|---|---|---|---|
| 2011/0304798 A1* | 12/2011 | Tanaka | .............. | G02F 1/133605 |
| | | | | 349/64 |
| 2015/0220058 A1 | 8/2015 | Mukhtarov | | |
| 2016/0307496 A1* | 10/2016 | Kubis | .................... | H05B 47/18 |
| 2017/0248790 A1* | 8/2017 | Cheng | .................. | G02B 6/0016 |
| 2017/0299794 A1* | 10/2017 | Fattal | .................... | G02B 30/33 |
| 2018/0210128 A1* | 7/2018 | Zeng | .................... | G02B 6/0081 |

FOREIGN PATENT DOCUMENTS

| | | |
|---|---|---|
| JP | 10-254338 A | 9/1998 |
| JP | 2001-284718 A | 10/2001 |
| JP | 2002-040911 A | 2/2002 |
| JP | 2010-039086 A | 2/2010 |
| JP | 2012-042654 A | 3/2012 |
| JP | 2015-230410 A | 12/2015 |
| WO | 1994/019712 A1 | 9/1994 |
| WO | 2011/033906 A1 | 3/2011 |

* cited by examiner

500

600

(a)                    (b)

OPTICAL DEFLECTION DEVICE, IMAGE DISPLAY DEVICE, SIGNAL DEVICE, IMAGE RECORDING MEDIUM, AND IMAGE REPRODUCTION METHOD

FIELD OF TECHNOLOGY

The present invention pertains to an optical deflection device which converts to almost parallel light the emission from a source such as a laser or LED that spreads with a certain angle of divergence centered on a certain light-emitting locus. It also pertains to a device and its medium, and a method, that enable illumination with uniform brightness throughout of an image of arbitrary aspect ratio by combining such an optical deflection device with an image display hologram.

BACKGROUND OF THE INVENTION

Illumination for reproduction with an image-displaying hologram or a holographic stereogram requires illumination by a directionally regular beam, such as parallel light, diverging light from a point light source or converging light collecting to a point light source. When diverging or converging light is used, although the recorded image may be distorted or changed in size, provided that the degree of the divergence or convergence is known, means of correction exist by changing the scale of, or by distorting, the recorded image beforehand. On the other hand, if illuminated by a plurality of point light sources or by a planar light source emitting light in irregular directions, there is no means of correction to avoid blurring of the image. That is, in the case of illuminating a relatively large hologram in sections, where continuity at the section boundary is important, a desirable image cannot be reproduced if the light intensity is very low at the boundaries, or if there are overlaps between areas or large differences in directions of light. Furthermore, the aspect ratio of the illuminated area is not necessarily matched by the natural area illuminated by the divergence and illumination angle of the light source. For example, when illumination is at an acute angle, the distance in the vertical direction is quite small and a light source with an aspect ratio with a long horizontal dimension would be required.

LITERATURE OF THE PRIOR ART

Patent Literature

Patent Literature 1

International Patent Publication WO2011/033906

Patent Literature 2

Japanese Unexamined Patent Application Publication No. 2002-040911

Patent Literature 3

Japanese Unexamined Patent Application Publication No. 2010-39086

Patent Literature 4

Japanese Unexamined Patent Application Publication No. 2012-42654

Patent Literature 5

Japanese Unexamined Patent Application Publication No. 2001-284718

Patent Literature 6

Japanese Unexamined Patent Application Publication No. 2015-230410

Patent Literature 7

Japanese Unexamined Patent Application Publication No. Heisei 10 (1998)-254388

In meeting such a requirement, an example of producing parallel light of large dimensions with different aspect ratios by combining square unit light sources is disclosed in Patent Literature 1. However, because of its construction with transparent Fresnel lenses which make use of refraction, a large distance is required from the light source to the Fresnel lenses, which results in the problem of color splitting by wavelength dispersion when a light source with wide wavelength distribution, such as phosphor-type white LEDs, is used.

Among image holograms is a type referred to as edge-lit, and since it has requisite elements which are different from those required for other holograms they are stipulated in the following. Edge-lit is a type of hologram with which illuminating light is incident to the side face of a transparent substrate at an angle that would result in total internal reflection in the absence of the hologram material, due to the angle of incidence in excess of the critical angle. In general, transparent substrates such as glass and plastics have optical refractive indices higher than that of air, many in the range 1.3-1.8. With a parallel plate, considering the refractive index of air to be unity, an angle of illumination within the medium at an angle in excess of the critical angle cannot be realized when light is made incident to the face on which the hologram is attached, or to the opposite face. For this reason, the terminology of edge-lit came into being to represent the incidence of light from the edge of the parallel flat plate, but the definition of the locus of the edge becomes problematic in cases when the hologram is placed on a substrate with the form of a cylinder or of non-parallel blocks. Here, edge-lit is redefined to be the reproduction by a hologram that is placed on a face such that the reproduction can take place by illumination that results in total internal reflection. Edge-lit holograms have long been noted for comfortable viewing due to the lack of illuminating light exiting the medium that has not been used for the hologram reproduction, as well as for the possibility of making compact reproduction devices, but there have been difficulties from the point of view of practical implementation. A factor in these difficulties has been the difficulty of making illuminating light propagate in regular direction inside the medium. Light-guiding plates for so-called edge-lit illumination such as in LCD backlights are in wide use, but parallel light is not necessary for the purpose of just backlight illumination and rather, light in various directions often are combined in order to achieve uniformity, which results in blurred images when directly applied to use in edge-lit holograms.

In Patent Literature 2, an example of reproduction of an edge-lit hologram is disclosed in which, upon forming parallel light outside the substrate, it is made incident to a substrate on which irregularities in the form of steps according to the angle of incidence are formed. However, this had the disadvantages that the form factor of the device becomes large because of the necessity of an optical system for external production of parallel light, that with step irregularities imperfect shape formation results in scattering caused in corners and edges, that when light incident to the irregularity is reflected by total internal reflection at the opposite face and then again enters the irregularity it is not totally reflected there but leaked outside, resulting in unilluminated areas, low utilization efficiency and causing scattering of the light. In addition, in order to reproduce an edge-lit hologram by attaching it to conventional glass or plastics, it was necessary to process the edges in order to guide the illuminating light into the medium at an angle in excess of the critical angle.

As other techniques, examples of projecting images displayed on spatial light modulator devices using holographic optical elements are disclosed in Patent Literature 3 and Patent Literature 4 for use in head-mounted displays. These are both used as optical devices for projecting images which are displayed on the display device, and the light incident to the medium that is used for introducing the light is passed through illumination optics and imaging optics prior to this so that the light-emitting locus of the light source and the holographic deflection device are not close to each other. Not limited to these Literatures, examples of the prior art for use in goggle-type displays and head-mounted displays all are uses as means to project the image of a spatial light modulator, and there was none that could be applied as a device to illuminate an edge-lit hologram displaying an image.

As still another technique, a device that performs deflection using a hologram is disclosed in Patent Literature 5 which comprises a photopolymer volume hologram in the external resonator of a laser and emits selectively transmitted laser light of a specified wavelength to the outside at the same time as making light emitted from the laser oscillator be diffracted and incident to the optics inside the resonator. This uses a transmission hologram, and the purpose is wavelength selectivity for laser resonance, not for altering such properties as the diffusion angle, the deflection angle, or the beam shape.

Patent Literature 6 discloses an example of placing an edge-lit hologram optical element over the entire face of a hologram for the purpose of illuminating a reflection hologram. However, this has the disadvantages that the illuminated hologram is not an edge-lit hologram and has many interfaces with the face of the hologram, and that in addition to the increased cost of material because of the necessity of placing holographic optical elements over the entire face where the image is viewed, there is impairment of the beam quality by undesired scattering, diffraction and absorption due to the hologram material and the recorded interference fringes, especially in the light in parts at a distance from the light source, because the light is repeatedly passed through the hologram material in multiple internal reflections, which results in impairment of the illuminated hologram image. Furthermore, external optics is required in order to make parallel the light incident to the light-guiding plate, making it difficult to realize a compact form factor.

As a holographic stereogram in cylindrical form the multiplex hologram produced by Lloyd Cross and others in 1972 is well known, which allows viewing from the entire 360 degrees around a transmission hologram that is not of edge-lit reproduction type. This scheme had the disadvantage of poor wavelength selectivity which resulted in problems such as color dispersion and undesirable visibility of the light source from the viewer. A cylindrical hologram of edge-lit reproduction type is disclosed in Patent Literature 7, but this case still was premised on reproduction by a single light source.

An alcove type of hologram is also known which is viewed from inside the curvature of a hologram that is arranged in a semi-cylindrical manner. Although this has a wide viewing angle and the advantage that the image can become removed from the hologram surface to float in the vicinity of the center of the cylinder, in practice, a large-scale apparatus was required such as for rear illumination with laser light using a large mirror. In both the multiplex type and the alcove type, frequently the majority of light from the light source was not illuminating the hologram and the light utilization efficiency was poor.

DISCLOSURE OF THE INVENTION

Problem to be Solved by the Invention

In order to, from light emitted by light sources such as lasers and LEDs which have a certain angle of divergence centered on a certain light-emitting locus, produce rectilinearly propagating light that reaches to a long distance with uniformity, it was necessary to use refractive optics such as lenses that are expensive and require space.

In order to produce, from light emitted by light sources such as lasers and LEDs which have a certain angle of divergence centered on a certain light-emitting locus, rectilinearly propagating light that reaches to a long distance with uniformity, it was necessary to use refractive optics such as lenses that are expensive and require space.

Thus, the purpose of the present invention is to enable the provision of a low-cost, compact three-dimensional image display device by realizing a low-cost, high performance optical deflection device and combining it with an image display hologram.

Means to Solve the Problem

The invention of the present application solves the foregoing problem by providing an optical deflection device characterized by comprising a light-emitting light source member, an effectively transparent medium with an optical refractive index 1.3 or greater, and a holographic diffraction grating placed on a part of the said medium without interposition of an air gap, and by causing light incident from the light-emitting light source member to the medium of optical refractive index 1.3 or greater to be reflected to a specified angular direction in excess of the critical angle with respect to the face of a holographic diffraction grating that changes both the angle of divergence and the angle of deflection.

The invention of the present application solves the foregoing problem by providing the above-described optical deflection device characterized by comprising a holographic diffraction grating of reflection type and by reflecting light inside the medium in a manner to make it almost parallel light.

The invention of the present application solves the foregoing problem by providing the above-described optical deflection device characterized by having the light deflected by the grating assume an approximately rectangular form.

The invention of the present application solves the foregoing problem by providing the above-described optical deflection device characterized by the arrangement of at least two light sources described in the foregoing, with approximately the same properties such as angle of divergence and wavelength components of emitted light, in directions along and perpendicular to the light-guiding direction, with a holographic diffraction grating disposed in opposition to each light source.

The invention of the present application solves the foregoing problem by providing the above-described optical deflection device characterized by the arrangement of at least two light sources described in the foregoing, with different wavelength components, in directions along and perpendicular to the light-guiding direction, and having a reflection holographic diffraction grating disposed in opposition to each light source.

The invention of the present application solves the foregoing problem by providing the above-described optical deflection device characterized by imparting to the said holographic diffraction grating an optical function described in the foregoing of diffusing light not in the direction perpendicular to, but only along, the light-guiding direction.

The invention of the present application solves the foregoing problem by providing an optical deflection device characterized by comprising at least two light-emitting light source members, an effectively transparent medium of optical refractive index 1.3 or greater, refractive optical function elements arranged with separations approximately matching those among the said light sources, and barrier walls placed in a manner which prevents incidence of light from the said light sources into neighboring refractive optical functional elements, and by causing light incident to the medium of optical refractive index 1.3 or greater to be reflected to a specified angular direction in excess of the critical angle.

The invention of the present application solves the foregoing problem by providing the above-described optical deflection device characterized by, as described in the foregoing, the placement of an optical functional element not imparted with diffusion function in directions perpendicular to the light-guiding direction, but only in the direction along the light-guiding direction.

The invention of the present application solves the foregoing problem by providing an image display device characterized by comprising a hologram which is formed on an effectively transparent medium of optical refractive index 1.3 or greater that is reproduced by illumination at a specified angle by light from at least two light sources arranged in directions along and approximately perpendicular to the propagation direction of the light and which is made almost parallel by diffraction or refraction.

The invention of the present application solves the foregoing problem by providing the above-described image display device characterized by the said medium of optical refractive index 1.3 or greater, as described in the foregoing, having approximately the form of a parallel flat plate.

The invention of the present application solves the foregoing problem by providing the above-described image display device characterized by the said medium of optical refractive index 1.3 or greater, as described in the foregoing, having approximately the form of a cylinder or of a partial cylinder.

The invention of the present application solves the foregoing problem by providing the above-described image display device characterized by the approximately cylindrical member on which the hologram is formed, as described in the foregoing, having the ability to be rotated with the axis of the cylinder as the center of rotation.

The invention of the present application solves the foregoing problem by providing the above-described image display device characterized by comprising an approximately cylindrical transparent cylinder on at least a part of which a hologram medium is attached, and by causing light incident to the face of the said cylinder from the outside from an approximately perpendicular direction as almost parallel light to propagate at a predetermined critical angle inside the medium.

The invention of the present application solves the foregoing problem by providing the above-described image display device characterized by comprising the said medium of the optical deflection device of optical refractive index 1.3 or greater, as described in the foregoing, and the said hologram, which are optically integrated.

The invention of the present application solves the foregoing problem by providing the above-described image display device characterized by comprising a member that is a medium of optical refractive index 1.3 or greater as part of the optical deflection device, as described in the foregoing, and by its being detachable from another said member that is a medium of optical refractive index 1.3 or greater, with the two members used to guide light by bringing the two members with approximately the same form of their cross-sections near each other.

The invention of the present application solves the foregoing problem by providing the above-described image display device characterized by a plurality of light sources arranged on the same flexible substrate and by the possibility to fix the said substrate in position such that a certain distance is maintained to the face of the medium of optical refractive index 1.3 or greater.

The invention of the present application solves the foregoing problem by providing the above-described image display device characterized by, with light from a plurality of light sources, and in a neighboring area illuminated by the said hologram, inverse compensation of the diffraction intensity of the hologram image according to the irradiance distribution.

The invention of the present application solves the foregoing problem by providing the above-described image display device characterized by, with light from a plurality of light sources, and in a neighboring area illuminated by the said hologram, inverse compensation of the reproduction angle of the hologram image according to the degree of parallelism of the light.

The invention of the present application solves the foregoing problem by providing the above-described optical deflection device characterized by carrying an inscription of at least one item of information describing the displayed color, wavelength, angle of illumination, angle of divergence or data for inverse compensation, for the image recording medium with which it is to be engaged.

The invention of the present application solves the foregoing problem by providing an image recording medium that is a recording medium of a hologram image in which an image displaying hologram medium and a light deflecting hologram medium are integrated with an effectively transparent medium of optical refractive index 1.3 or greater, and that appropriately reproduces the said image display hologram when a diverging light source is placed at a specified locus close to the said optical deflection hologram medium.

The invention of the present application solves the foregoing problem by providing the above-described image recording medium, characterized by having a different shape formed on a part of the said medium according to at least one among the items of information about the displayed color, wavelength, angle of illumination, angle of divergence or data for inverse compensation, and of which the position and angle are fixed by engagement with the shape that is formed on the light-source side.

The invention of the present application solves the foregoing problem by providing the above-described image recording medium, characterized by carrying, on some part, an inscription of at least one item of information describing the type of light source, wavelength, angle of divergence or data for inverse compensation, for the light source with which it is to be illuminated.

The invention of the present application solves the foregoing problem by providing an image display device or an optical deflection device characterized by comprising an effectively transparent medium with an optical refractive index 1.3 or greater, a hologram medium placed on the surface of the said medium without interposition of an air gap, and at least two illuminating light sources which propagate in the said hologram medium in directions at angles in excess of the critical angle from inside the said medium.

The invention of the present application solves the foregoing problem by providing the above-described image display device or a signal device, characterized by further comprising a means to switch among at least two illuminating light sources as described in the foregoing, and displaying different images from the same locus.

The invention of the present application solves the foregoing problem by providing the above-described image display device or a signal device, characterized by further comprising a means to switch among the illuminating light sources when, as described in the foregoing, viewing the said hologram medium from at least two different loci in order to enable the recognition of at least two different states.

The invention of the present application solves the foregoing problem by providing the above-described image display device or a signal device, characterized by comprising a means to switch among the illuminating light sources such that there are at least two colors of light diffracted by the said hologram, as described in the foregoing, of which at most only a single color is recognized when viewing the said hologram medium from at least two different loci, in order to enable the recognition of at least two different states.

The invention of the present application solves the foregoing problem by providing a means of image reproduction in which an edge-lit hologram produced by a separate process is attached without interposition of an air gap onto the face of an effectively transparent medium of optical refractive index 1.3 or greater in the form of a cylinder with curvature or of a partial cylinder, and light at an angle in excess of the critical angle is made incident to the said transparent medium for viewing a reflection hologram image after passing through the said transparent medium.

Effects of the Invention

The present invention enables the conversion of light emitted by light sources such as lasers and LEDs, which have a certain angle of divergence centered on a certain light-emitting locus, to rectilinear light by a very simple arrangement at low cost and with a compact form factor.

In addition, the present invention enables the provision of a compact, low-cost illumination device in illuminating image display holograms of various aspect ratios and sizes.

In further addition, in such equipment as traffic signals, it enables contributions to the reduction of the number of signal units themselves in cross-sections, the number of LEDs used therein, and the cost and environmental load incurred thereby.

8

PREFERRED EMBODIMENTS OF THE INVENTION

The embodiments of the present invention are explained in the following by reference to the figures.

As the first embodiment, a reproduction device 100 for an edge-lit reproduction holographic stereogram as shown in FIG. 1 is explained. A volume hologram recording material 102 of optical refractive index approximately 1.5 is attached to a substrate 101 of transparent, colorless acrylic material of optical refractive index approximately 1.5 and thickness 5 mm without interposition of an air gap, and interference fringes are recorded on this recording material which can display a three-dimensional image hologram with viewing angles vertically ±20° and horizontally ±45° centered on the normal direction when illuminated by parallel green light centered on 532 nm from a direction of approximately 60 degrees inside the medium.

On this substrate 101, another volume hologram recording material 103 is attached similarly without interposition of an air gap, in a specified position, different from that of medium 102, in which an image hologram is recorded, and a reflection holographic diffraction grating 104 is formed on this recording material which, when illuminated by a diffuse light source of a specified wavelength, for example, centered around 532 nm, with a specified diffusion angle from an angle of 0° inside the medium, that is, in the normal direction, from the side opposite to the side of attachment, reflects the parallel light at that wavelength at an angle of 60° inside the medium. It is possible to make such a diffraction grating by diffusing laser light of a wavelength close to that of the LED that is used, and recording the interference fringes in a volume hologram material upon interference with parallel light propagating at the critical angle inside the medium.

This holographic diffraction grating is formed on the same medium, with 16 units, each in a form approximately 17.3 mm square, arrayed without gaps in the direction perpendicular to the propagation direction of the light inside the medium.

Green LEDs 105 are placed on the side opposite the face to which substrate 101 is attached, each directly facing the center of a unit holographic diffraction grating in proximity maintaining a specified distance. The LEDs are constituted as SMD (Surface-Mount Device) type devices pre-wired on a substrate 106 in the form of a tape, and are disposed with the same 17.3 mm pitch as the holographic diffraction gratings described in the foregoing, and in the same number as the holographic diffraction gratings.

Propagation of the light is explained by taking up just the eighth LED (L8) and the holographic diffraction grating (H8) disposed in opposition to it. The diffusion angle of the LED is taken to be known, for example, with a full width at half maximum of 120°. The position of the light emitting locus of the LED is fixed at a position which is several mm from the face of the acrylic substrate, taking into account the refraction of the substrate. Light from the LED is delivered to the holographic diffraction grating intermediated directly by the acrylic substrate, and the green wavelength component propagates in the direction toward the edge-lit reproduction hologram as parallel light at 60° inside the medium.

An angle of 60° inside the medium results in total internal reflection at the interface with air, since the critical angle is exceeded due to the difference in refractive indices with air. Since the holographic diffraction grating has a square shape, the relationship of the length y in the direction of propagation of the light to the angle of propagation θ inside the medium and the thickness t of the acrylic substrate, is $y=2t \times \tan \theta$, and thus the illuminating light inside the medium is made to be delivered in the same amount to any position in the propagating direction.

Since this holographic diffraction grating is designed in such a way that, upon illumination by a specified diffusing light source, light propagates as parallel light inside the medium, parallel light is delivered to area X8 in a strip of width 17.3 mm.

As the edge-lit reproduction holographic stereogram 102 is reached, only this section of width 17.3 mm is reproduced, and the viewer perceives a three-dimensional image.

Whereas the case of turning on the eighth LED alone has been explained, if all LED light sources from 1 to 16 are turned on, the entire area of the edge-lit holographic stereogram is reproduced.

A first concrete example is explained in the foregoing, but the present invention is not limited to the embodiment described in the foregoing, and various modifications based on the technical ideas of the present invention are possible.

The image reproduction hologram is an edge-lit reproduction holographic stereogram of reflection type in the explanation, but it is not limited to be a stereogram and may also be a hologram by laser illumination of real objects. In the following, these will together be described as holograms, including holographic stereograms. Further, the images viewed by the image reproduction hologram include such images as three-dimensional images, motion images varying with the viewpoint, two-dimensional still images, patterns and uniform colors. Although the reflection type has higher wavelength selectivity than the transmission type, in principle, application is possible also with the transmission type, that is, the type in which attachment is to the viewer side of the substrate.

The transparent substrate is acrylic material in the explanation, but it may of course also be glass as well as polymer material such as polyethylene terephthalate (abbreviated as PET), polycarbonate, polyamide, and triacetylcellulose (abbreviated as TAC). The hologram material, in addition to photopolymers, may also be such materials as silver halide materials or dichromated gelatin. Since the optical refractive index of hologram materials is generally in the range 1.3-1.7 and there is less formation of unnecessary holograms in the absence of optical interfaces with the substrate, an optical refractive index that is as well matched as possible is desirable. When utilizing total internal reflection, it is necessary to constitute the substrate with a transparent material of optical refractive index 1.3 or greater.

The angle of propagation inside the medium is 60° in the explanation, but it is not limited to this. However, in the case of implementation of an edge-lit reproduction type, propagation at an angle in excess of the critical angle is required.

The light source is LED of the SMD type in the explanation, but it may also be of the bullet type or the FLUX type. Furthermore, it may also be such lamps as laser diode, xenon or krypton. The wavelength produced by the light source is green in the explanation, but it may be monochromatic light such as red or blue also, or white light.

By using laser diodes it is possible to achieve an image quality with less color dispersion than by using LEDs because of the narrower light emission wavelength bandwidth. Further, conversion to parallel light is comparatively easy because they are closer to being point light sources. In the case of semiconductor lasers, the aspect ratio of the beam is frequently not 1:1 since the angles of divergence are generally different in orthogonal directions. It is possible to design the holographic diffraction gratings that are placed facing the light sources so that conversion to an ideal aspect ratio takes place, taking into consideration the light guiding direction.

The beam profile is generally with light intensity that is high in the center and low in the periphery, as with the Gaussian distribution. By making the diffraction efficiency of the holographic diffraction grating that is placed facing the light source to be low in the center and high in the periphery, it is possible to make the diffracted light intensity as uniform as possible. As described in the following, it is also possible to realize such a function by placing a gradation mask in the illumination optical path or by applying data compensation in advance to the hologram image to be reproduced, and these can also be used in combination to improve uniformity.

The holographic diffraction grating is made to have the function of causing diffusion of light not in the direction perpendicular to, but only along the propagation direction to the extent of less than approximately five degrees. This has the effect of making less noticeable the boundaries between regions with different numbers of times of total internal reflection, since clear visibility of contrast at such boundaries makes the hologram image difficult to view. An image with extensive depth would become blurred if light is diffused in the direction of the parallax, but it is possible to reproduce an image that is not blurred because there is no diffusion in that direction. It is also possible to insert a one-dimensional diffusion plate in the light path for the same purpose. The purpose of the one-dimensional diffusion plate can be achieved with such components as a lenticular lens or one with a reflective mirror evaporation-deposited on the rear side, as well as a transmission holographic diffraction grating. A separate one-dimensional diffusion plate may be used in combination with the present holographic diffraction grating.

The image hologram can also be in full color, and the light source can also be white light. A second embodiment, a full color display 110, is explained with reference to FIG. 2. Three types of volume hologram recording materials, red in position 103A, green in position 103B and blue in position 1030, are attached to the same acrylic substrate 104A without interposition of an air gap, and each recording material is made to diffract red, green and blue light as a reflection holographic diffraction grating 104A, 104B or 104C, respectively. In corresponding positions, a red LED is placed in position 105A, a green LED in position 105B and a blue LED in position 105C, so that by lighting each of them the combined light is propagated to the material in which a holographic image is recorded to reproduce a holographic image. It is not necessary for the arrangement of red, green and blue to be in this order. Since use of reflection holographic diffraction gratings have better wavelength selectivity, these diffraction gratings for each color may be partly or wholly overlapping, provided that the cross-talk among the red, green and blue wavelength distributions is at a negligible level. That is, an LED device in which red, green and blue light-emitting elements are mounted inside one package may be used, together with holographic diffraction gratings that are formed in the same locus. This is because a diffraction grating for a different color that does not meet the Bragg diffraction condition allows light to be propagated by total internal reflection, without being affected.

The viewing angle of the hologram is centered on the direction of the normal to the face of the hologram in the explanation, but the image may also be reproduced for a different angle. For example, when placed on the surface of a touch panel of a bank ATM, during the period of waiting for a withdrawal transaction an advertisement may be displayed by LED illumination which is normally turned off to make the presence of a hologram display unnoticed.

Optical contact between the hologram and the transparent substrate is required for use in the edge-lit reproduction mode. They are directly attached in the example described above, but a transparent, colorless adhesive material may also be used. In this case, it is desirable to match the optical refractive index of the interposed material to be as well matched as possible to that of the substrate and the holographic recording material. Preferably the difference should be kept to be less than 0.2, since the existence of a difference in the refractive indices can result in unnecessary holograms by reflection at the interface as well as in total internal reflection depending on the angle inside the medium, which disturb the formation of the desired hologram image.

Although it is described in the foregoing that it is important to design the size of the holographic diffraction grating based on the relationship between the thickness of the substrate and the angle inside the medium, it is not necessary to follow exactly the formula described in the foregoing. The size may be made somewhat greater in order to intentionally increase the overlapping parts to make the boundaries less noticeable. The diffraction grating does not, of course, need to be square. However, in using light sources such as LEDs which have no difference in the angles of beam spread in the vertical and horizontal directions, it is often desirable that the vertical and horizontal dimensions are approximately equal so that the angles of divergence in the two directions are the same. The reason for the square shape, rather than a circular shape, is the convenience in placing the gratings next to each other without spaces between them, but it is not a requirement. The distances between centers of the diffraction grating elements, that is, between centers of the light sources, may also be chosen freely upon consideration of such properties as the uniformity.

The material of a hologram undergoes contraction and expansion after being recorded, depending on the recording material. This causes the diffraction wavelength and diffraction angle at the time of reproduction to be changed from those at the time of recording. Thus, in designing and fabricating a holographic diffraction grating it is important to perform the recording at a different angle and wavelength, with a presumption of this change, so that prescribed properties of the light at the time of reproduction can be secured.

A third embodiment is explained with reference to FIG. 3. The arrangement is similar to the first embodiment, but each diffraction grating element is formed as a holographic diffraction grating that produces light in the propagation direction that is almost parallel light in the direction of the thickness of the substrate but that is diverging light in the direction perpendicular to it, with each diffraction grating element having a different angle of beam spread, as shown in the Figure. A different hologram image is reproduced when each of L1-L16 is turned on in sequence. The intensities of the LEDs are gradation-controlled so that as one LED gradually darkens the neighboring LED gradually lightens, and thus a moving three-dimensional image is made to be seen even by a stationary viewer.

It is not necessary that the LED light sources disposed in opposition to the holographic diffraction gratings are arranged in a single row. A fourth embodiment, an input interface device 200, is explained with reference to FIG. 4. An image hologram medium 202 is placed in optical contact to a transparent, colorless substrate 201 in the middle on the side opposite the viewer, reflection holographic diffraction gratings 204A, 2048, 204C and 204D are disposed in optical contact in four surrounding directions, and light sources 205A, 205B, 205C and 205D are placed in proximity in positions respectively in opposition to them. 205A is an LED containing a red component and, when turned on, the light is made to propagate inside the substrate 201 by the reflection holographic grating 204A disposed in opposition to it and is delivered to the image hologram medium 202 to reproduce a red hologram image. 205B, C and D are similarly red LEDs, and it is arranged that the same hologram medium 202 can be illuminated by almost parallel light at different specified angles by the diffraction gratings 204B, C and D. When 205A, B, C and D are sequentially turned on with different timings, different images are reproduced from the same locus of 202. This interface functions as an input device, and it may be put together so that when the substrate 201 is pressed while the hologram image A is being reproduced, a switch which is not shown in the figure is activated to enable function A, and when the substrate 201 is pressed while the hologram image B is being reproduced, function B is enabled (similarly also for C and D). This can be a switch with plural functions even though it is a single switch.

In an example of a modification of this embodiment, there is only a single light source 205A that can be rotated in relation to a member in which a holographic diffraction grating and an image hologram medium are integrated, so that the holographic diffraction grating facing 205A can be changed and set to any one of 203 A-D by rotating these relative to each other in steps of 90 degrees. When 205A is turned on while 205A is positioned to face 203A the image corresponding to A is caused to be reproduced by 202, and if the switch is pressed at that time function A is enabled. When 205A is turned on while it is facing 203B the image corresponding to B is reproduced and the switch for B functions. Four different switches, with C and D also in similar manner, can be made to function with just one. The present explanation is with four different switches, but any number that is two or greater may also be implemented as long as there is no cross-talk among the images.

The present concept, with a transparent substrate of the edge-lit type, of displaying different hologram images by switching a plurality of light sources from which light is incident from a plurality of different angles of incidence to provide different input interfaces according to the timing of the pressing action, may also be implemented by direct incidence from the edge face rather than by deflection using holographic diffraction gratings.

The first embodiment presumes a parallel flat plate, but it may also be in cylindrical form or be with curvature. A fifth embodiment, a cylindrical display device 500, is explained with reference to FIG. 5.

For example, holographic diffraction grating elements are attached without interposition of air gaps on the inner side of a transparent acrylic cylinder of outer diameter 150 mm, inner diameter 144 mm and length 200 mm, on the cylinder member at the upper end and the lower end. In addition, an edge-lit reproduction type hologram HS is attached on the inner side of the middle of the cylinder, also without interposition of an air gap. When the LED at position LA1 on the outer side of the cylinder is turned on, an image is reproduced at segment HS1 of the hologram HS by propagation inside the acrylic cylinder in a direction parallel to the axis of the cylinder caused by the holographic diffraction grating element HA1 at the locus facing that position. The area illuminated by LA1 is only segment HS1 and other areas are not reached. Actually, LEDs LA1, LA2 . . . are disposed in similar fashion on the outer side all around the cylinder, which results in the reproduction of a hologram image that appears as if it is floating inside the cylinder. Other LEDs are disposed on the outer side of the cylinder facing toward the inside at positions LB1—also, and a different image is reproduced when the LEDs of row LA are turned off and LEDs of row LB are turned on. It is also possible, in reverse of the embodiment described in the foregoing, to place LEDs on the inner side of the cylinder and the holographic diffraction gratings on the outer side of the cylinder. In either case, the holographic diffraction grating is made to produce by reflection uniformly directed beams inside the cylinder that do not have power in the direction parallel to the axis, but are propagated along directions passing through the central axis when observed in cross section perpendicular to the axis of the cylinder. This preserves continuity upon a change in the number of total internal reflections. The image holograms are also recorded in a manner such that undistorted images are reproduced when illuminated by such light. The image hologram may be flat when it is recorded and, in recording for a holographic stereogram, the image is distorted in advance by consideration of the curvature of the medium on which it is to be attached.

The cylindrical holographic stereogram has the advantage, in comparison to previous examples of usage such as the multiplex hologram explained in the section on the prior art, that by the invention of the present application a plurality of light sources may be used to enable the viewer to reproduce a bright image without being aware of the light sources.

A sixth embodiment is explained as a rotating cylindrical display 600 of FIG. 6. The cylindrical hologram explained in the fifth embodiment is made possible to be rotated with the axis of the cylinder as the center. The axis of the cylinder is horizontal and three cylinders HX, HY and HZ are able to be rotated independently around the same axis. With HX, when light sources LB1-LB5 are turned on, images are reproduced at segments HS1-HS5, respectively, of the holographic recording medium by propagation inside the acrylic cylinder HX at angles exceeding specified critical angles by means of the edge-lit type holographic diffraction gratings HA1-HA5 at the loci facing those positions. A different hologram image is reproduced by the same segments HS1-HS5 when the LEDs LA1-LA5 are turned off and LEDs LB1-LB5 are turned on. Similarly, also with HY and HZ, hologram images HT and HU are reproduced by the holographic diffraction gratings of groups HC, HD, HE and HF facing the light sources of groups LC, LD, LE and LF. Cylinders HX, HY and HZ are able to be rotated independently with the axis as the center and other hologram images are reproduced when holographic diffraction gratings in other loci are moved to positions LA1-LA5. Since these cylinders, including the holographic media, are transparent it is possible to overlay and display together letters, patterns and images formed on a separate rotatable body, not shown in the Figure, that are placed on the inside sharing the same axis. The hologram images may be made to be reproduced only when such features as images and letters become aligned in such ways as vertically, horizontally or diagonally, as the three cylinders are rotated independently. The light sources may be disposed on the outer side of the cylinder facing toward the inside with the holographic diffraction gratings disposed on the inner side of the cylinder or, conversely, the light sources may be disposed on the inner side with the holographic diffraction gratings disposed on the outer side of the cylinder. The case is explained in the foregoing of, with the light sources fixed to the enclosure, rotating only the cylindrical substrate on which image holograms and holographic diffraction gratings are disposed, but it is also possible to fix the light sources and the holographic diffraction gratings and rotate only the cylindrical substrate on which image holograms are disposed. In such a case, it is beneficial to interpose a liquid between the holographic diffraction gratings and the cylindrical substrate since it is desirable that they are made of materials with matched refractive indices and are in optical contact, which avoids such problems as optical loss. However, as described in the following, if two members that are cut and separated at an angle that does not give rise to total internal reflection are coupled by placing them adjacent to each other, it is possible to realize light guiding of the necessary illuminating light since there is little optical loss even in the presence of an air gap.

The shape of the medium on which the image holograms are attached does not need to be a complete cylinder but may be a part thereof. It may be, when seen from the side of the viewer, a convex shape, a concave shape or these, also including the shape of a parallel flat plate, joined together continuously. There is also the advantage of the possibility to widen the viewing angle by partially bending with curvature a part of the edge of a mostly flat substrate. It is also possible to express an image as if it is floating in air by adopting a convex shape referred to as the alcove type.

In the case of applying the invention of the present application to automobile tail lamps and brake lamps, it is possible to make the part seen from the rear be nearly flat substrates and deflect light also to the lateral directions by making the edge parts have convex curvature as seen from the outer side.

In the example explained using the Figure, curvature is only in an uniaxial direction, but it is also possible to have curvature also in the direction perpendicular to this direction, or to have a spherical shape or a shape of a part of a sphere. In the case of recording image holograms with curvature that is different from the curvature in the viewing condition, it is needless to say that images that are distorted in advance are to be recorded.

The position of the light emitting locus of the optical element in opposition to a unit holographic diffraction grating is strictly specified. The relative position of the light emitting locus may be made to change with time within the range of the width of the unit holographic diffraction grating. In the case of SMDs, since it is possible to place the light emitting loci in proximity, a plurality of proximal LEDs may be turned on in sequence, or a single light source may be made to physically undergo relative movement.

An example 170 in which a plurality of image display units are arranged in the depth dimension is shown in FIG. 7. For example, different holographic diffraction gratings are formed on three different units of transparent plastic substrates. Unrelated separate images may be displayed, or different parts of the same object may be displayed together as a whole. Since the distances from the light sources 107A, 107B and 107C to the respective corresponding holographic diffractions gratings 108A, 1088 and 108C are different, diffraction gratings with focal lengths according to each case are in place.

Strict specification is required of the positions of the light sources and the holographic diffraction gratings. An example 800 of this structure is explained with reference to FIG. 8. A hologram medium 804, on which an array of diffraction gratings 803 is formed, is attached on a part of one side of a transparent plastic substrate 801. Since this medium 804 is made to be in contact with a transparent plastic substrate 812, this substrate plays the role of a protective layer. Many SMD type LEDs are arrayed and wired, in registration with the unit diffraction gratings of the holographic diffraction grating array, on a substrate 806 in the form of a tape. On one hand, structural parts 807 of convex shape are formed on a part of this tape-form substrate and, on the other hand, concave shapes 809 are formed on the plastic material 801 which can be engaged with them, and the positions are determined by fitting together these convex and concave parts together at the time of assembly. 808 is a spacer. In addition, there is a magnet 811 on the back side of the tape-form substrate, as well as another magnet 810 further on the outer side of the holographic diffraction grating, which makes it possible to fix them together by the resulting attractive force between both of these magnets. By ensuring the specified positions in this way, when the light source 805 is turned on, on the presumption that the transparent plastic substrate 801 and the holographic diffraction grating are, of course, attached together in specified positions with respect to each other, almost parallel light is produced by the holographic diffraction grating 803 in the direction 813 inside the medium, so that it is possible to fix the positions and angles with high precision by carrying out exposure and attachment upon determining positions using these concave parts 809.

The method of determining positions is not limited to the foregoing, but it is desirable that the relationship between the positions of the light sources and holographic diffraction gratings, and the angle, are uniquely determined. It is also possible to adopt a method, on the contrary, of disposing roughly without particular determination of positions and fixing them in the best condition by monitoring to confirm the parallelism of the light.

There are various specifications for a holographic diffraction grating, such as the wavelength to be diffracted, the diffraction angle and the distance to the light source. Since these specifications are not necessarily immediately obvious by just its appearance, it is good to have these main specifications of a holographic diffraction grating inscribed on the medium in which the holographic diffraction grating is recorded, or on an adjacent substrate that is not easily separable therefrom. Various methods are conceivable as the method of inscription, such as printing, laser marking and etching. For representative specifications, for example, the parts with shapes which are used for engagement in 800 may be made to have characteristic features so that the positions are determined by the fit if the combination is consistent with the design, but that it is made obvious by the bad fit that the combination is not good for use when it is attempted to put light sources and holographic diffraction gratings together in a combination that is not consistent with the design.

In example 800, it is presumed that the light from the light source is incident to the holographic diffraction grating facing it at the specified angle as well as angle of divergence, and it is desirable that light that is delivered outside this range or that is not diffracted is prevented from propagating inside the plastic substrate 801 or being scattered, by measures such as transmission out of the plastic substrate 801 and absorption by such members as black parts.

For this reason, blackening treatment is applied to the vicinity and back side of the medium of the holographic diffraction grating of 801. Specifically, such processes are applied as painting with black paint and applying black adhesive material.

It is also important to avoid illumination of neighboring diffraction gratings when a holographic diffraction grating is illuminated by a light source that is disposed in opposition to it. This is because light that is delivered to a neighboring diffraction grating will result in propagation of light that is different from the specified angle and wavelength inside the plastic substrate 801, giving rise, when engaged with an image hologram, to such problems as poor contrast, reproduction of multiple images and blur. For this reason, in example 900 shown in FIG. 9 a wall 820 of black material is set between the target and neighboring diffraction gratings and, in example 950 shown in FIG. 10 louver films 821 and 822 are placed on the plastic substrate either on the side of the LEDs or between it and the holographic diffraction gratings, or in both places.

In the case of using an optical deflection device as explained in the foregoing, and of attaching an image hologram on a transparent substrate into which almost parallel light is introduced, the transparency on the side opposite the viewer may be set freely. If it is made transparent there is an advantage of the ability to view background images and objects in see-through fashion. On the other hand, if the background is a light white color, the transparency of the background may be made low since the hologram image is more difficult to see. It is also possible to use an anisotropic element that has different transparencies in different directions or a screen that changes transparency depending on its electrical condition. A display such as a liquid crystal display or an OLED display may also be placed on the back side.

The substrate on which the image hologram is placed may also be a touch panel functioning as an input interface. The hologram may also be placed on the face of such displays as of a smartphone or of a PC monitor, playing the role of a protective film while avoiding interference with the input interface function.

An example of application to such signs as traffic signals and road signs is explained as an eleventh embodiment with reference to FIG. 11. In general, traffic signals, although they are installed directed somewhat downward, wastefully emit light also to regions where they are not seen by any person, since there is no great restriction of the viewing angle in different directions. Furthermore, as shown in FIG. 11, in a location where a traffic signal is installed where a branch road joins a main trunk road, erroneous recognition can occur because of the small angular difference between a driver travelling on the main road in zone H1 and a driver travelling on the branch road in zone S1. In such a location a panel to control the viewing angle, referred to as a louver, might be placed on the front face of the signal. The presence of such a louver results in restriction of the amount of light reaching the eyes of the driver and the darkening makes it more difficult to see. The use of a hologram, by making it possible to strictly define the positions of visibility, has the advantage that light can be concentrated for increased brightness in areas of visibility to the extent that the viewing angle is restricted. The power consumption for obtaining the same brightness can be reduced if a smaller number of LED light sources are deployed. In addition, by use of the invention of the present application, it is possible to impart signal information of different colors from a single signal device in multiple directions, which is a great advantage since this would lead to a reduction of the number of signal devices themselves.

An example of a traffic signal 150 in a location where fields of view are close to each other as in FIG. 11 is explained with reference to FIG. 12. 151 is a transparent plastic substrate or a glass substrate with image holograms in the center part which diffract, from left to right, green, yellow and red light in specific limited directions, and on their lower and upper parts are holographic diffraction grating arrays 154A, 154B and, disposed in opposition to them, LED light source arrays 155A, 155B, respectively. L1-L5 are green LED light sources, and holographic diffraction gratings 153A disposed in opposition to them have the function to make the light propagate at an angle of approximately 60°, that is, in excess of the critical angle, inside the transparent substrate 151. When light sources L1-L5 are turned on, the light that is delivered to part G of the image hologram medium 152 results in emission of green light in direction LL. When light that propagates inside the substrate from above is made incident to the same hologram 142, light is emitted in the direction RR from the same area when the LED light sources R1-R5 disposed in the upper part are turned on, because this same part G is fabricated so that green light is emitted in direction RR by the same area. Similarly, when L6-L10 are turned on, yellow light is emitted in direction LL and, when R6-R10 are turned on, yellow light is emitted in direction RR, respectively, from area Y. In similar fashion, LED light sources L11-L15 and R11-R15 are red LEDs, or LEDs which emit light including a red component, and it is possible to light a red hologram image from area R in the appropriate direction by having the light sources Rx and Lx (x is 1-16) be each turned on with a different timing.

An example 160 of an all-round cylindrical traffic signal is explained with reference to FIG. 13 and FIG. 14. FIG. 13 is an aerial view of a five-way intersection. Since the installation of a traffic signal for each vehicle road not only would require many signals but also would have the problem of difficulties to know which signal should be attended to, only a single cylindrical hologram traffic signal S1 is to be installed above the center of the intersection. With a hologram, the viewing zone can easily be made narrow by restricting the position of the illuminating light source. Specifically, an external view is shown in FIG. 14(A) and its internal structure is shown in (B). The specific details of the structure are omitted here since they are the same as in the fifth and sixth embodiments; it is possible to emit light signal information of a specified color in only a particular restricted direction by illuminating the signal-emitting image hologram with a number of LEDs selected from an array disposed in a full circle. For example, FIG. 14(C) shows aerial views of the viewing zones when red LEDs RU1-360 are arrayed above, and RL1-360 below, the area of the display and either RU10-60 or RB30-80 is illuminated. In a case such as of a perpendicular four-way intersection, there is no overlap between the areas of the image holograms illuminated by lighting RB100-150 and RB10-60, and also in a case of an irregular intersection in which different signals are to be seen from zones close to each other signals can be displayed without any problem by the presence of RU and RB. Here, there is a great advantage in using holograms because in the case of traffic signals in which LEDs are just simply placed facing outward as shown in FIG. 14(D) it is not possible to restrict the viewing zones.

Also, whereas the foregoing explanation of the main invention of the present application presumes the generation of parallel light inside the medium by using a reflection holographic diffraction grating, since illumination of the same transparent substrate using a plurality of light sources in edge-lit reproduction is itself without precedent, the conventional type in which light is incident from the edge is additionally explained.

In a case in which an edge-lit image hologram is attached to a flat plate of thickness t in which light is guided at an illumination angle θ, it is necessary to have light that is made almost parallel by external optics to be incident from a light introduction path with a shape as shown in FIG. 15. That is, a shape is made with a maximum thickness of $2t \times (\sin \theta)^2$ since simply cutting the edge of thickness t perpendicular to the incident light would result in parts to which light is not delivered by total internal reflection. In this way, the invention of the present application can be applied in the embodiments explained in the foregoing without the necessity of using holographic diffraction gratings. Cases in which light is guided in a cylinder or a partial cylinder can also be realized by putting in place a light introduction path such as the one with the cross-section shown in FIG. 15.

Such cases are explained with reference to 700 shown in FIGS. 16 and 710 shown in FIG. 17. Paths for light introduction are formed at the ends of cylinders 701 and 711, and it is possible to produce almost parallel light inside the medium from the outer side of the cylinder to the inner side, or from the inner side to the outer side, respectively. Here, the incident face 702 may be flat, and light that is made almost parallel in advance by using a light source and a collimator lens may be made incident to it, the face may be continuous such as in a part of a cone, or the incident face or the face of the first reflection may be made to function as a lens with power. Example 700 in FIG. 16 shows an example in which an integrated unit comprising a light source 704 and a collimating Fresnel lens 703 is placed near the incident face 702. In FIG. 17, 710 shows an example in which a convex aspherical face 713 is formed on the surface of the incident face 712 in order to make light from the light source 714 parallel. Whereas, on one hand, placement on the outer side has the advantage of easier arrangement because of the possibility to have greater separation between adjacent light sources, on the other hand, placement on the inner side has the advantage of more compact housing. In either case, when the light sources are mounted on a flexible substrate which is itself oriented to emit light in the direction perpendicular to the face to which the light is incident, it is preferable to have the form with a fan-like layout plan as shown in FIG. 16(c), but this is not a requirement as long as, with even a common LED tape, a holding assembly is made to direct the light from the light source in the specified direction. In addition, it is also possible to use an LED tape of edge-emitting type.

Also, as shown in FIG. 18, presuming the normal incidence of almost parallel light 725, it may be deflected in the direction of angle θ of total internal reflection inside the medium by forming an opposing face 721 at an angle α to the normal of the incident face and applying a vacuum evaporated mirror or attaching a mirror to it. If this is done with the relationship θ=(180°−α)/2, it is made possible to reproduce an edge-lit hologram with angle θ inside the medium. The light introducing element member and the edge-lit hologram member 724 are preferably integrated as a single piece, but there is no problem even if they are separated at the interface 723. If separated, there is an advantage that viewing by interchanging different media, on which edge-lit holograms are formed and which can be made at low cost with simple parallel flat plates, is made possible in combination with an illumination device for edge-lit holograms that is made with comparatively expensive components for the light sources and the light introducing element. In this case, the surfaces of both faces at 723, on the side of the light introducing element and on the side of the edge-lit hologram element, are required to be highly precise, preferably with planarity greater than λ, but it is not necessarily required to match indices since, even if an air gap is interposed, propagation is not at an angle at which total internal reflection occurs. Of course, the indices may be matched using such material as a transparent liquid, a gel material or silicone rubber.

An example of application of the foregoing is shown in FIG. 19. In the cylindrical edge-lit hologram 730, a reflection hologram 733 is formed which reproduces a diffracted image centered on approximately the normal direction toward the outer side of the cylinder when illuminated in direction 739 at approximately 60 degrees in the medium from the inner side of the thin transparent acrylic cylinder. A black film for enhancing contrast is placed in proximity with an interposed air gap further on the inner side of this hologram layer. In order to further enhance the contrast, it is also possible to attach such material as a black film without interposing an air gap by interposing an adhesive, but when it is desired to reproduce the hologram image with higher order reflections of light, interposition of an air gap is chosen to avoid absorption by a black film. There is no glare by leakage of light that does not contribute to the reproduction since a light-stopping cap 738 is fitted onto the end of the cylinder opposite the incident face. A large number of laser modules 743 with integrated semiconductor lasers 735 and collimator lenses 736 are arranged equally spaced on the base 740 directed from the outer side of the cylinder toward the center so that almost parallel light is incident to the light introducing acrylic cylinder 741 from the outer side. Because of the presence of mask 744 with a rectangular aperture, this circular beam becomes a rectangular beam. In addition, in this example, a diffusion plate filter 742 that slightly diffuses light only in the vertical direction is inserted just before incidence into the cylinder. Although it is not necessarily required some extent of overlapping has the effect of reducing the prominence of the irregularity when it is difficult to make the light intensity uniform at the boundaries between parts with different number of times of reflection in the vertical direction. In such a case, no such problem as blurring occurs when a hologram with parallax only in the horizontal direction is reproduced, since the light is not diffused in the horizontal direction. The function to diffuse light in only one direction is not required to be at the position shown as 742, but may also be worked on the opposing mirror surface or the surface of the cylinder on the incident face. If holographic diffraction gratings are used for deflection, a function to diffuse slightly only in the direction of propagation of the light may be pre-recorded in the holographic diffraction gratings. Since the opposite face is slanted at an angle of approximately 60 degrees in cross-section, and has a vacuum-evaporated mirror coating 734, the light is propagated inside the medium in the direction of 60 degrees. Both the light introducing acrylic cylinder 741 and the cylindrical hologram 730 with which it is engaged have the same inner and outer diameters so that, by engagement at the openings, optimal illuminating light is delivered to the edge-lit locus when the light sources are turned on. Switches which are not shown are built in to 740, and lighting may be made to last during a certain length of time after mounting the cylinder, for example, about three minutes, and then be turned off.

Because there is no such precedent of reproducing a reflection hologram by attachment of an index-matched hologram on the inner face of a cylinder to bring about total internal reflection, an example of variations in which illumination is not necessarily by a plurality of light sources also is shown in FIG. 22. The cylindrical hologram display

750 is a thin cylinder 751 to which an edge-lit type hologram 753 is attached and contains a laser module 763 inside. The laser module is made to be turned on and emit parallel light by adjustment of a red laser 755 and a collimator lens 756, and the light emitted in nearly the direction of the axis of the cylinder illuminates the thin cylinder by means of a conical mirror 761. The light which is approximately normally incident to the cylinder from the inner face is made to propagate inside the thin cylinder at the angle of total internal reflection by means of the conical shape formed on the outer side of the cylinder and mirror 754 that is formed on its surface. The composition of the layers of the hologram medium attached on the inner face of the cylinder is, in order from the inner face to the inside, a transparent adhesive 764, a hologram recording medium 753, a transparent protective substrate layer 757 and a black blocking layer 760. The blocking cap 758 and the base 752 are both made of either nontransparent material or diffusing material so that there is no leakage of laser light to the outside without being diffused.

730 of FIG. 19 and 750 of FIG. 22 both are fabricated by attaching a medium with a prerecorded hologram, which has been exposed by a separate hologram recording apparatus, on the inner side of a cylinder or a partial cylinder, that is, the side with the smaller curvature. This attachment was performed by using a roller with a smaller curvature than that of the inner side of the cylinder, to which the face to be attached is lightly bonded, to bring the face in proximity and to bond it by pressing with the roller so that air is not trapped. The bonding process is not limited to this method, and the essential point of the present invention is the reproduction of a hologram image as a reflection type by illumination of an edge-lit hologram, attached to a cylinder or a partial cylinder constituted by a transparent substrate with curvature that has an optical refractive index 1.3 or greater, with light that is guided at the angle of total internal reflection inside the substrate. Whereas, previously, edge-lit holograms were generally reproduced in transmission mode, by reproducing in reflection mode it has become possible to reproduce hologram images of high image quality due to both greater wavelength selectivity and angular selectivity compared to the transmission mode. The curvature of the medium during the recording of the edge-lit hologram may be different from the curvature of the surface of the cylinder to which it is attached during reproduction. By performing, in advance of recording, compensation by image processing based on a presumption of the curvature in the final attachment, it is possible to express images that impart natural three-dimensional perception.

Ideally, no double image or distortion arises even in the presence of some overlap from adjacent light sources when perfectly parallel light are adjacent, but the images reproduced by adjacent light sources become discontinuous especially when light is diffused or condensed in directions perpendicular to the axis of the cylinder. In FIG. 21, with A, B, C, D as areas of the edge-lit hologram that are each illuminated by one light source, the arrows a, b, and c inside the areas show the directions of the partial light rays from each light source. Although c of A and a of B are adjacent, the reproduced image does not become discontinuous since the directions of the rays are the same. On the other hand, with c of C and a of D the reproduced image becomes discontinuous since the directions of the rays are different. In the present invention, the image can be made to be continuous even in such a case as with C and D by distorting in advance to compensate the image to be reproduced. It is also possible to perform such image compensation not only in the horizontal direction but also in the vertical direction. That is, this means that the hologram image to be displayed is distorted in advance, as the directions of the rays in the peripheries of the beams can be in some cases different between light that is reflected n times and that is reflected n+1 times at the same face. When illumination takes place by multiple times of total internal reflection, light that does not contribute to the reproduction of the hologram can illuminate as accumulated higher order reflected light, but this also results in gradual reduction of the intensity. In order to correct for this, the diffraction efficiency itself of the hologram image is compensated to vary between positions near to and far from the light source.

In addition, when the illuminating light from each light source has an intensity profile with a bright center and dark periphery, it is possible to take compensating measures such as to insert an optical functional device such as a gradation mask in the light path or to inverse compensate for the reproduction intensity of the hologram image. That is, uniformity is produced by compensation because, as shown in FIG. 20(a), by a Gaussian distribution the periphery is darker than in the center and adjacent beams of light take on a distribution when light from a plurality of light sources are made adjacent or are reflected multiple times in the light-guiding direction. For example, if the intensity in the periphery is about 50% darker than in the center, a filter is inserted in the light path which has transmittance that varies gradually with position so that the transmittance in the center is ½ of the transmittance in the periphery. And if a holographic diffraction grating is used for deflection, the diffraction efficiency in the center is made to be about ½ of the efficiency at the periphery. Furthermore, since the information about light and dark positions are known in a device for reproduction of a hologram image if the positions of the light deflecting device which is the illuminating device and of the edge-lit hologram are well-defined, the diffraction intensity of the hologram image is varied by pre-compensating the image of the recorded edge-lit hologram so that it is brighter where the illumination is dark and darker where the illumination is bright One of the foregoing measures may be applied alone, or they may be applied together.

As light deflection devices of various specifications for illuminating edge-lit holograms become widely used, and many types of edge-lit holograms with images to which correction and compensation that are tied to the characteristics of these light deflection devices come to exist, it is necessary to assure that a light deflection device, as the viewer, and an edge-lit hologram, as the medium, are used in appropriate combination. To this end, in the present invention, information about the type of light source as well as the wavelength and angle of divergence of the light that should be used for illumination, and data for optical compensation, are inscribed both on the side of the light deflection device as well as on the side of the edge-lit hologram. These can be also in the form of symbol markings. For the cylindrical hologram display 730 in FIG. 19(a), examples are shown in which information and symbols as in FIGS. 19(d) and (e) are inscribed at position 745 on the side of the device and at position 746 on the side of the cylinder 731. Furthermore, different shapes are formed on a part of the hologram medium according to at least one among the set of information about the type of light source as well as the wavelength and angle of divergence of the light that should be used for illumination, and data for optical compensation. Use in other than the appropriate combination is prevented by making it impossible to engage the medium with the light source, which is made to have a shape that can engage to define the positions and angle only with an appropriate medium. The cylindrical hologram display 730 of FIG. 19(a) has a notch 747 on the device side so that the cylinder 731 cannot be engaged unless a protrusion, not shown in the figure, on the piece matches the notch 747.

Many variations are conceivable of the type of light source, its position and the direction of incidence of the light. For example, all elements such as a battery and a light source may be encased inside the cylinder so that an image is reproduced when the cylinder rolls over.

When an edge-lit hologram is made to have a cylindrical shape and to be able to undergo rotational motion with some speed relative to the light source member, effects and functions may be added by varying the control of the light sources. For example, consider that an edge-lit hologram rotates slowly at about one turn per minute, while the light source rotates around the same axis at 120 turns per minute. If the light source is continuously turned on, there is an advantage that such disamenities as non-uniformity and speckle noise which are present when the light source remains fixed disappear to allow uniform reproduction of the image by averaging. Furthermore, by rotating a set of RGB LEDs or lasers, it is made possible to reproduce a natural full color image by aligning what would be seen as color breakup if the light source were fixed. In addition, by adjusting the timing and duty ratio of the emission of the light source in synchronization with the rotation, it is made possible to vary the parallax of the hologram image to add an expression of motion. The essential point of the present invention is to make it possible to view the full hologram image by using a plurality of light sources to illuminate an edge-lit image hologram by area division or by time division.

In the present invention, in principle, the transparent substrate is configured to have the light that is utilized to reproduce the image pass only once through the holographic diffraction grating. This is because if the light returned by total internal reflection again illuminates the holographic diffraction grating, the parallelism of the beam which reproduces the image hologram deteriorates, which results in degradation of the image quality of the image hologram.

In the foregoing, examples of application of the image hologram in automobile tail lamps and brake lamps, gaming machines and traffic signals are explained, and the advantage, especially in the type which uses reflection holographic diffraction gratings, is the ability to float a three-dimensional image simply by attaching a hologram medium without undertaking procedures such as processes to work on existing transparent material such as glass and plastics. It is possible to make the rear window of an automobile function as high-mounted brake lamps, to float such images as holograms, advertisements and signage in such places as glass windows and doors of shops and homes, or shop windows.

If disposed in such places as on the surface of a television screen or a smartphone, it is possible to display a three-dimensional image when it is not in use.

Use as such items as a trophy, medal, award certificate, plaque, nameplate, door plate or signage is also possible. It may also be put on such water tanks as in such facilities as an aquarium or in the home for such aquatic life as tropical fish. It may also be applied as a part of a PET bottle, of a glass bottle for liquor or such contents as liquid condiments, or of a drinking cup or glass. It is also possible to add new value to a cylindrical glass speaker or AI speaker by putting an edge-lit hologram on its surface.

Explanation is added of an example of application in which, although a reflection holographic grating is used to transform a diverging light source into almost parallel light, it is not used in combination with an image hologram.

That is, if a medium of optical refractive index 1.3 or greater, on which a reflection holographic diffraction grating is attached, is placed immediately after the light emitting locus of a light source such as an LED or a laser, it is possible to make a laser pointer or LED pointer without using such elements as a collimator lens. A smaller, lighter and lower-cost unit can be realized. Also, it is possible to produce linear parallel light by only a process to attach a tape LED, on which a plurality of light sources are arrayed, to a transparent plastic substrate. For example, the configuration in example 950 shown in FIG. 10 is configured to make the light be emitted into air with loss kept to a minimum from a face that is approximately perpendicular to the direction of propagation after it is made parallel inside the plastic medium. This linear light source can be used in such applications as signage for lighting structures such as buildings.

As in the foregoing, the reflection type of holographic diffraction gratings for deflecting light from light sources is mainly explained, but there is no problem with the use of the transmission type as well as long as the function is fulfilled. Although it is needless to remark that the wavelength selectivity and the angular selectivity are higher with the use of the reflection type which enhances the performance as a light filter, it is possible to use the transmission type if the modulation of the refractive index and the thickness of the material are designed appropriately.

As in the foregoing, a number of examples of application is explained, and it is needless to say that application to a variety of modified cases is possible as long as such effects as have not been hitherto obtained are realized by use of holographic diffraction gratings for deflection, by illumination of edge-lit reproduction holograms with a plurality of light sources, or by their combination.

Figure 1:
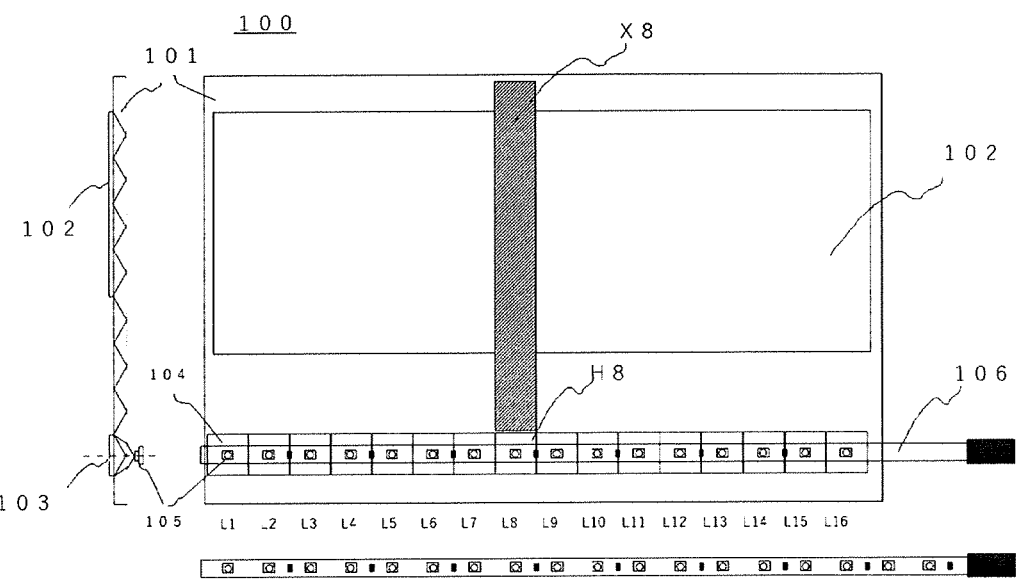
FIG. 1 An illumination device for an edge-lit reproduction hologram (First Embodiment) in which the present invention is applied FIG. 2 An illumination device for a full color edge-lit reproduction hologram (Second Embodiment) in which the present invention is applied FIG. 3 An illumination device for a time-sequential edge-lit reproduction hologram (Third Embodiment) in which the present invention is applied FIG. 4 A switching device with an edge-lit reproduction hologram display function (Fourth Embodiment) in which the present invention is applied FIG. 5 A cylindrical edge-lit reproduction device (Fifth Embodiment) in which the present invention is applied FIG. 6 A rotating cylinder edge-lit reproduction device (Sixth Embodiment) in which the present invention is applied FIG. 7 A depth-wise multilayered edge-lit reproduction device (Seventh Embodiment) in which the present invention is applied FIG. 8 An example of a positioning device for light sources and holographic diffraction gratings, in which the present invention is applied FIG. 9 An example of barriers placed between holographic diffraction gratings by applying the present invention FIG. 10 An example of louver films placed between holographic diffraction gratings by applying the present invention FIG. 11 An example of a place where traffic signals are installed that require control of the viewing angles FIG. 12 An example of the configuration of a traffic signal in which the present invention is applied FIG. 13 An example of a place where it is appropriate to install a cylindrical traffic signal of the present invention FIG. 14 An example of the configuration of a cylindrical traffic signal of the present invention FIG. 15 An example of the edge-lit light-introduction path of the present invention FIG. 16 First example of the cylindrical edge-lit light-introduction path of the present invention FIG. 17 Second example of the cylindrical edge-lit light-introduction path of the present invention FIG. 18 An example of the edge-lit light-introduction path of the present invention FIG. 19 An example of the cylindrical edge-lit light-introduction path of the present invention FIG. 20 Diagram explaining the compensation in the present invention to obtain uniform brightness of the hologram image FIG. 21 Diagram explaining the compensation in the present invention for the distortion of the hologram image FIG. 22 Diagram explaining the cylindrical display of the present invention
Figure 2:
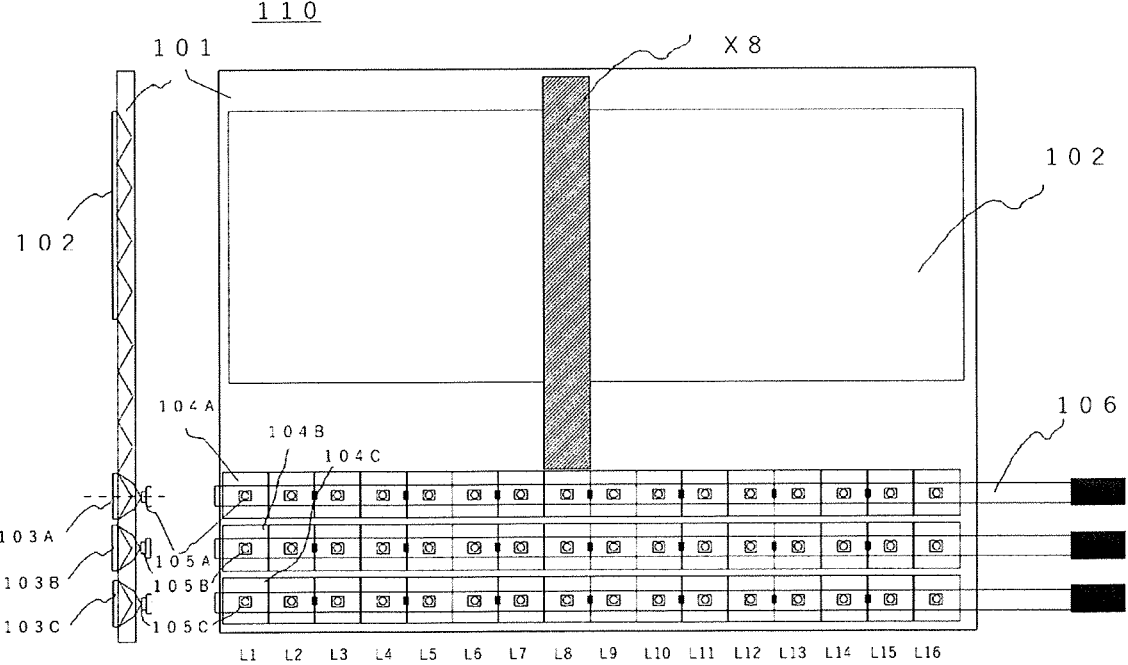
Figure 3:
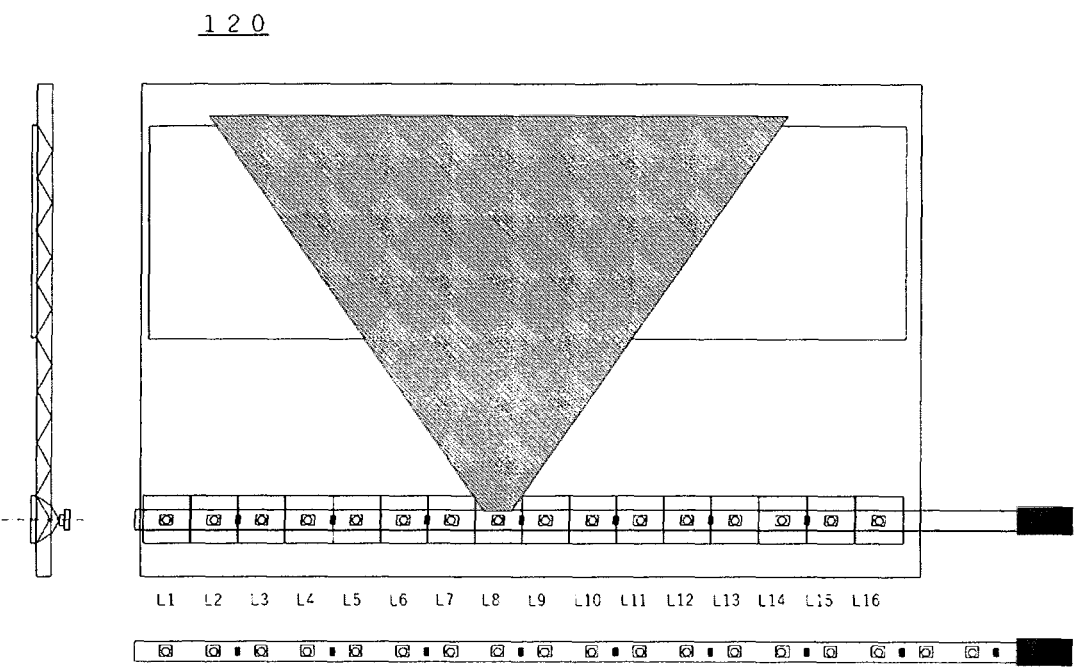
Figure 4:
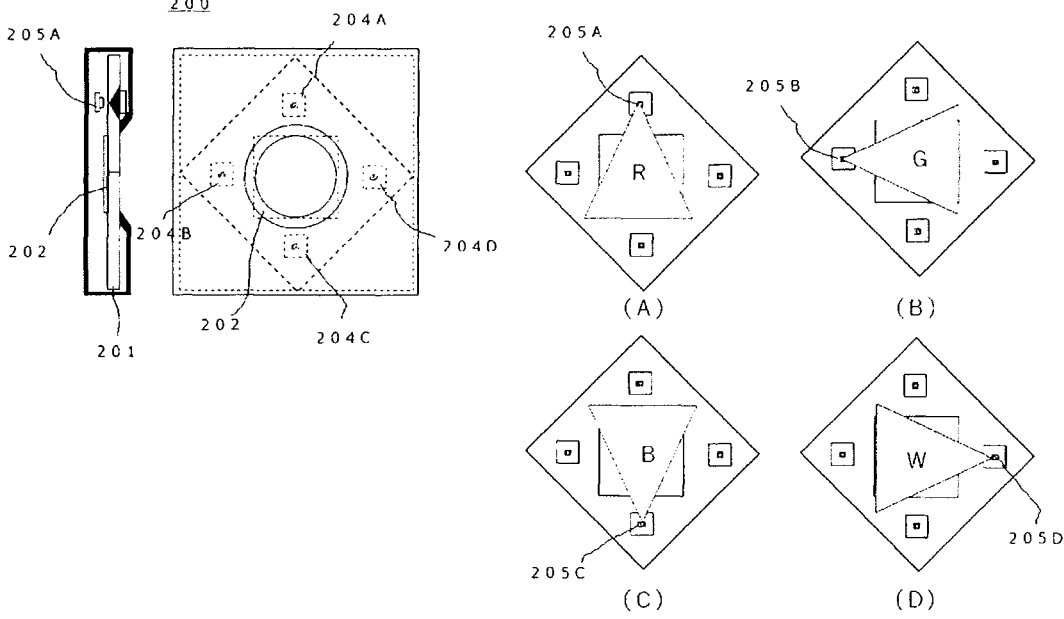
Figure 5:
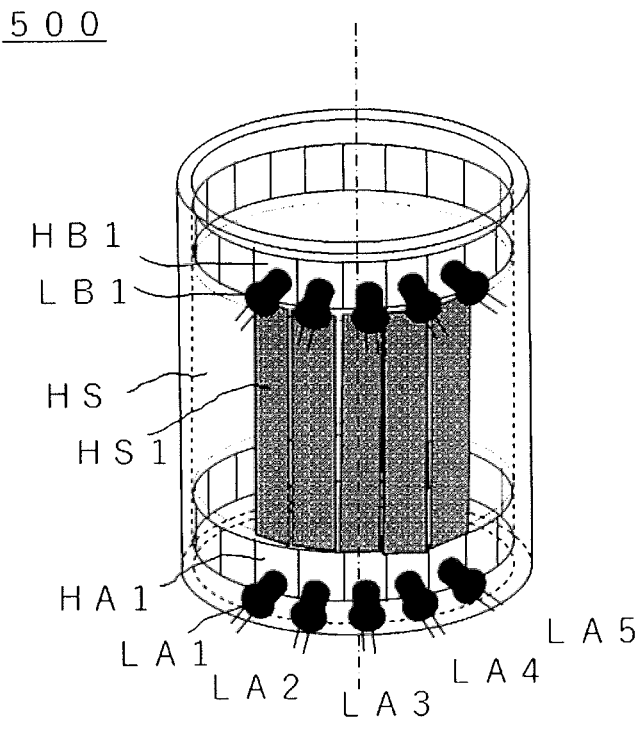
Figure 6:
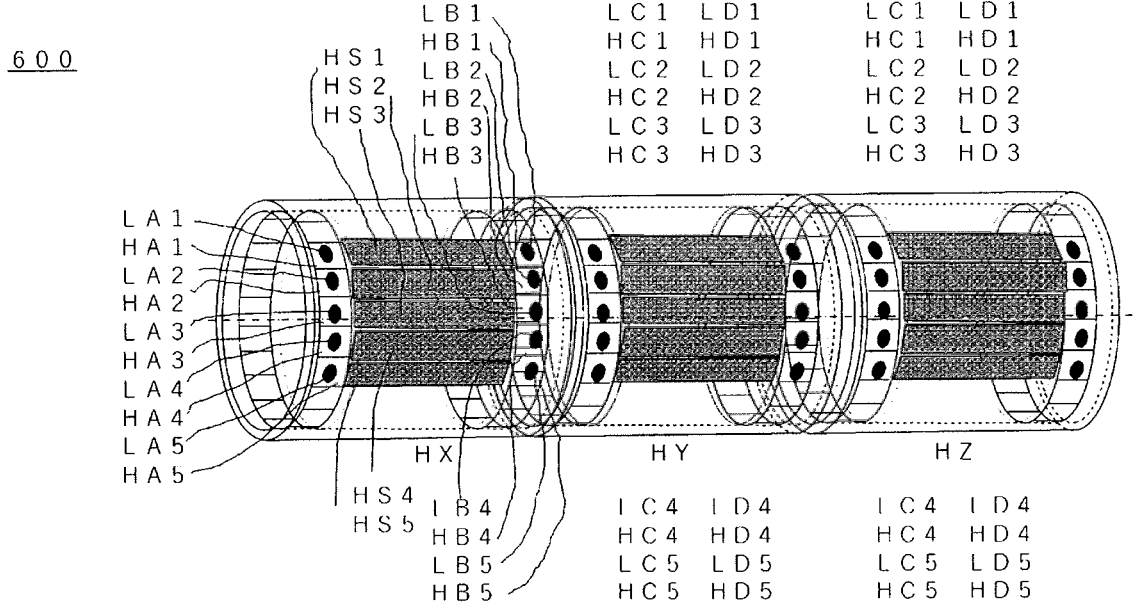
Figure 7:
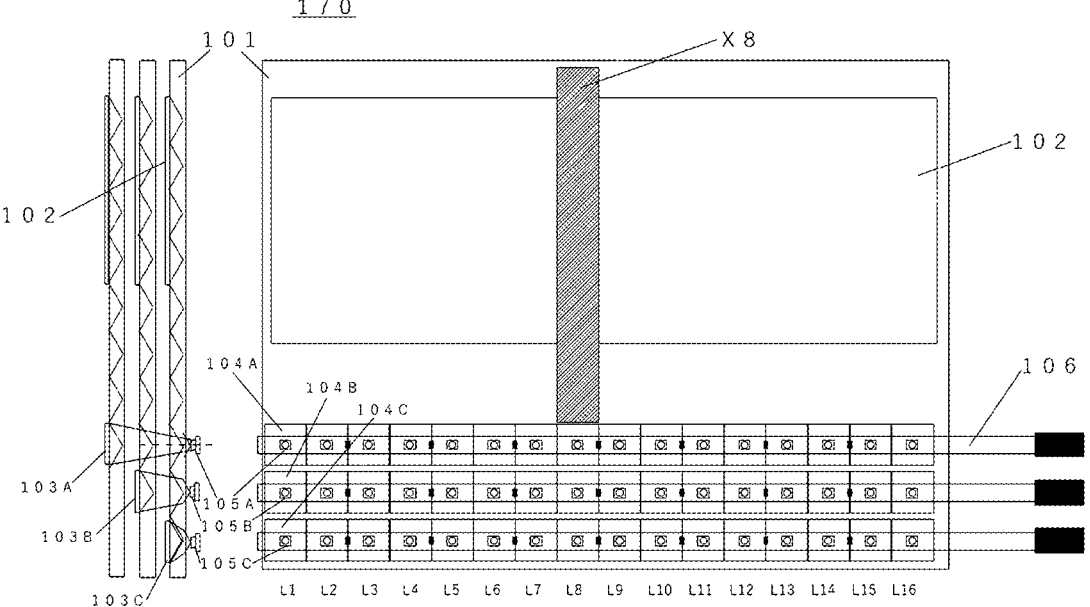
Figure 8:
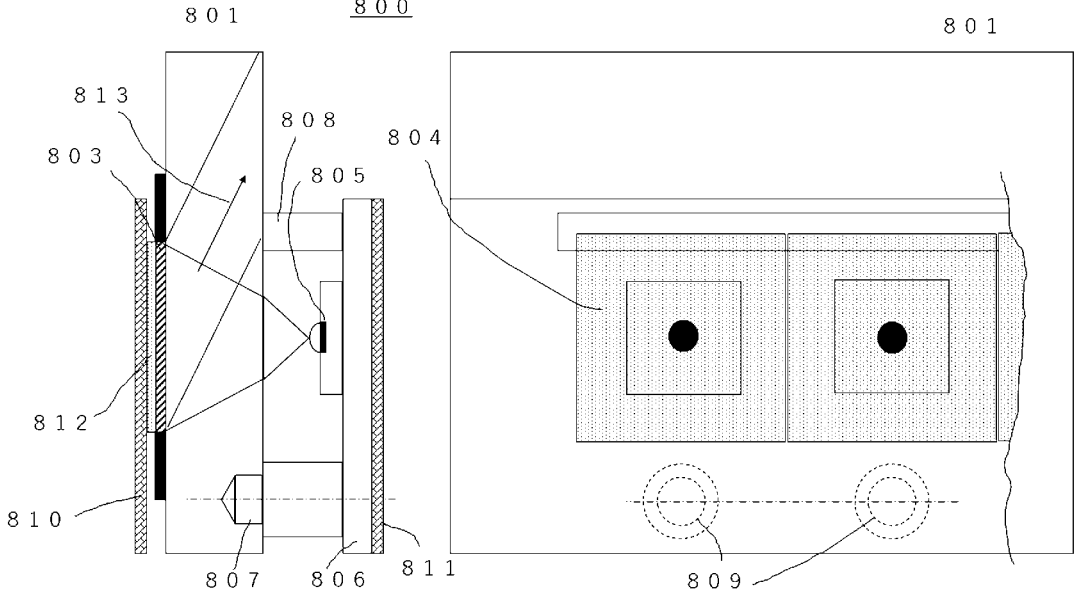
Figure 9:
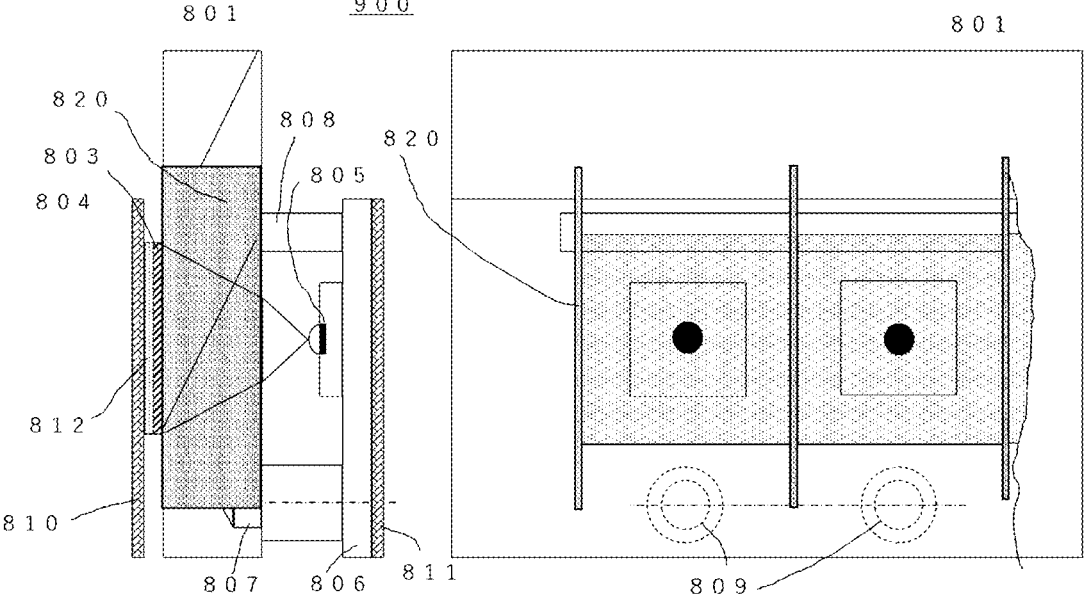
Figure 10:
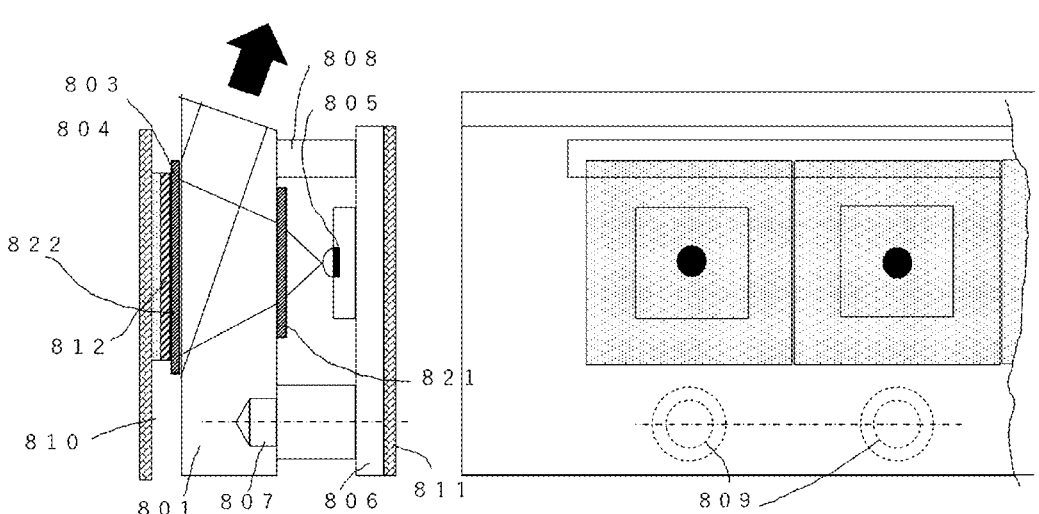
Figure 11:
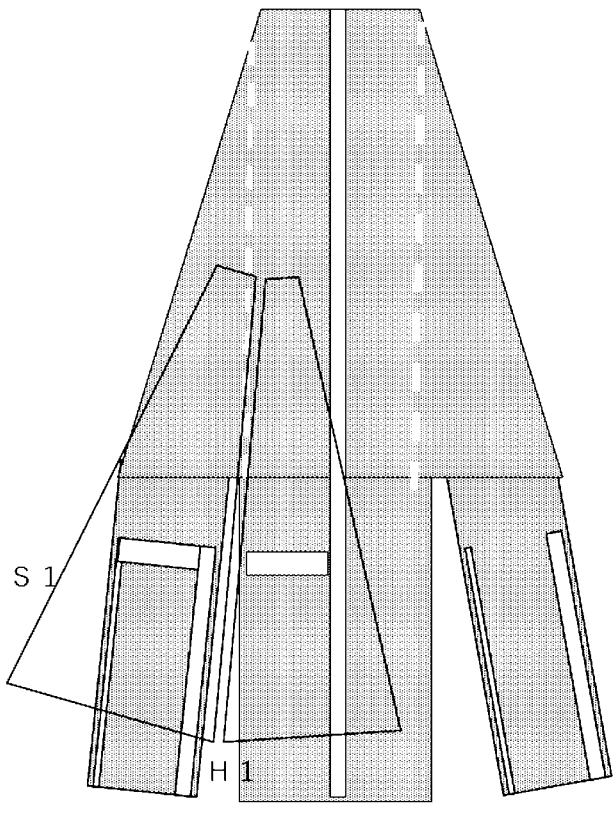
Figure 12:
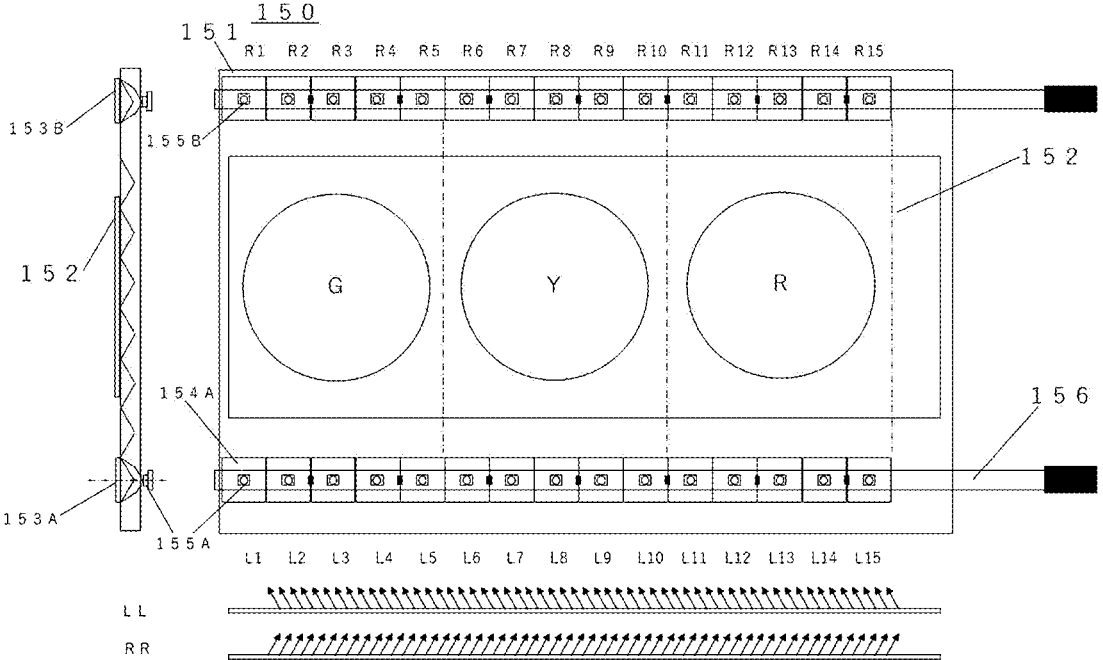
Figure 13:
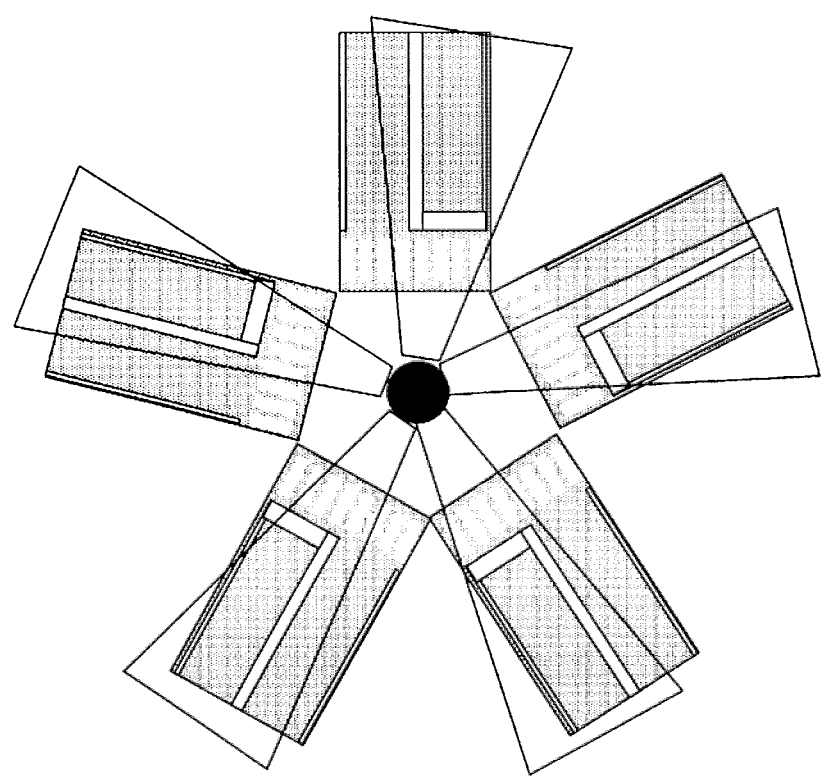
Figure 14:
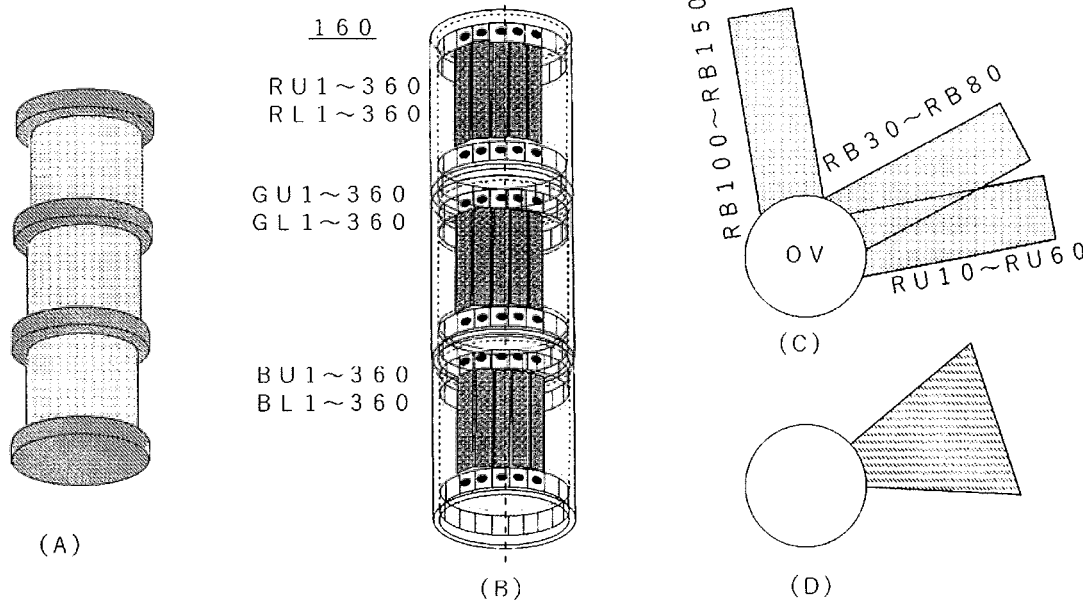
Figure 15:
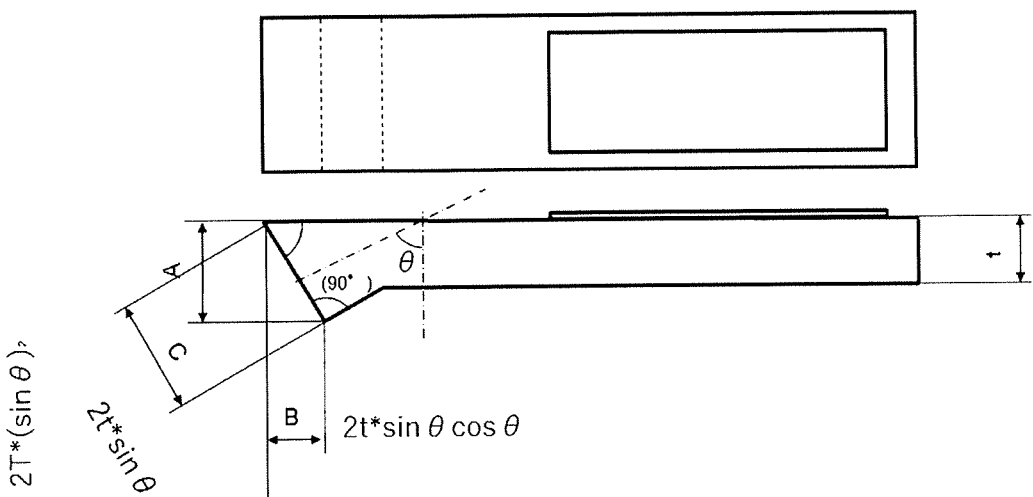
Figure 16:
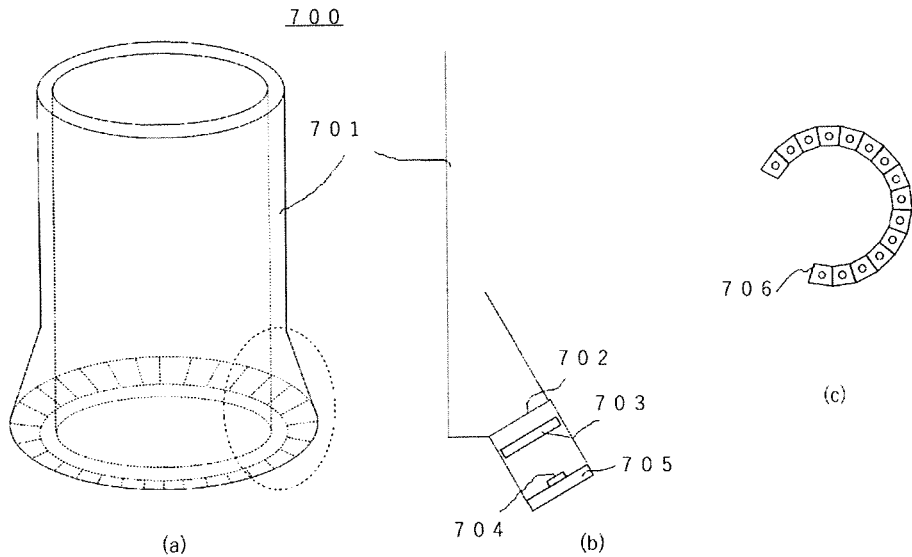
Figure 17:
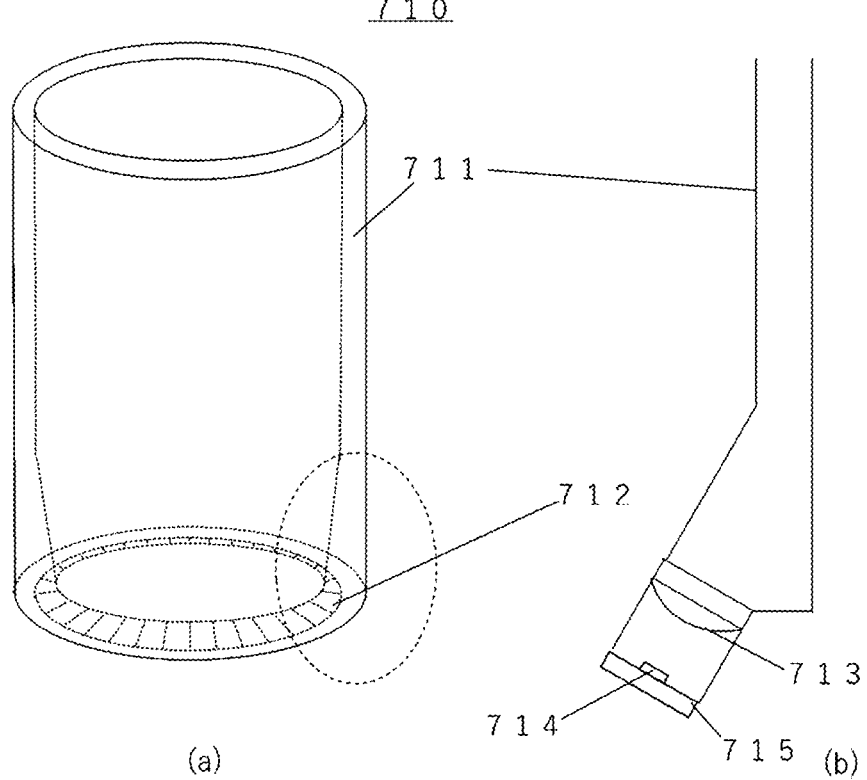
Figure 18:
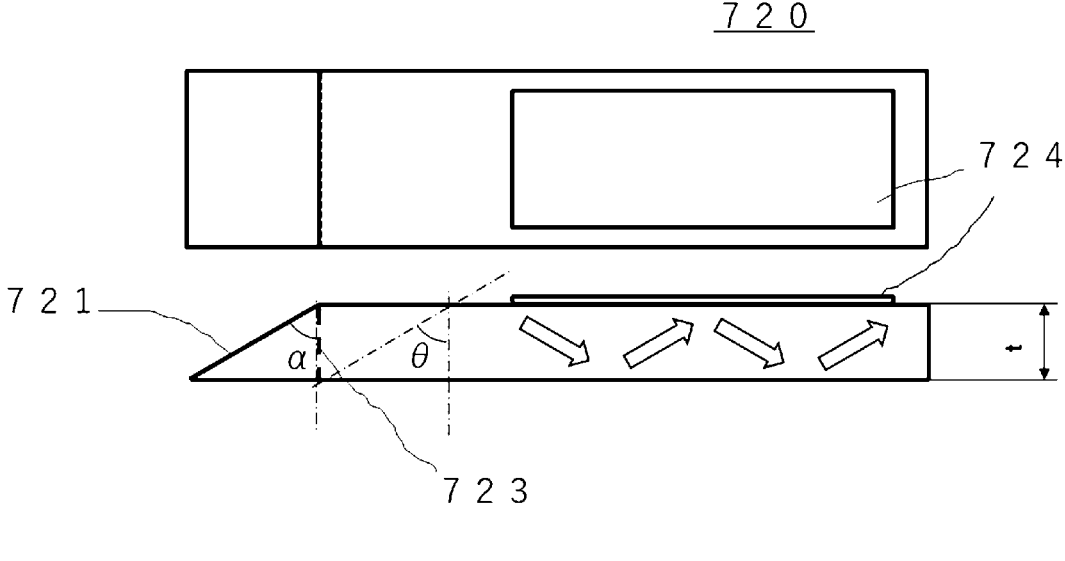
Figure 19:
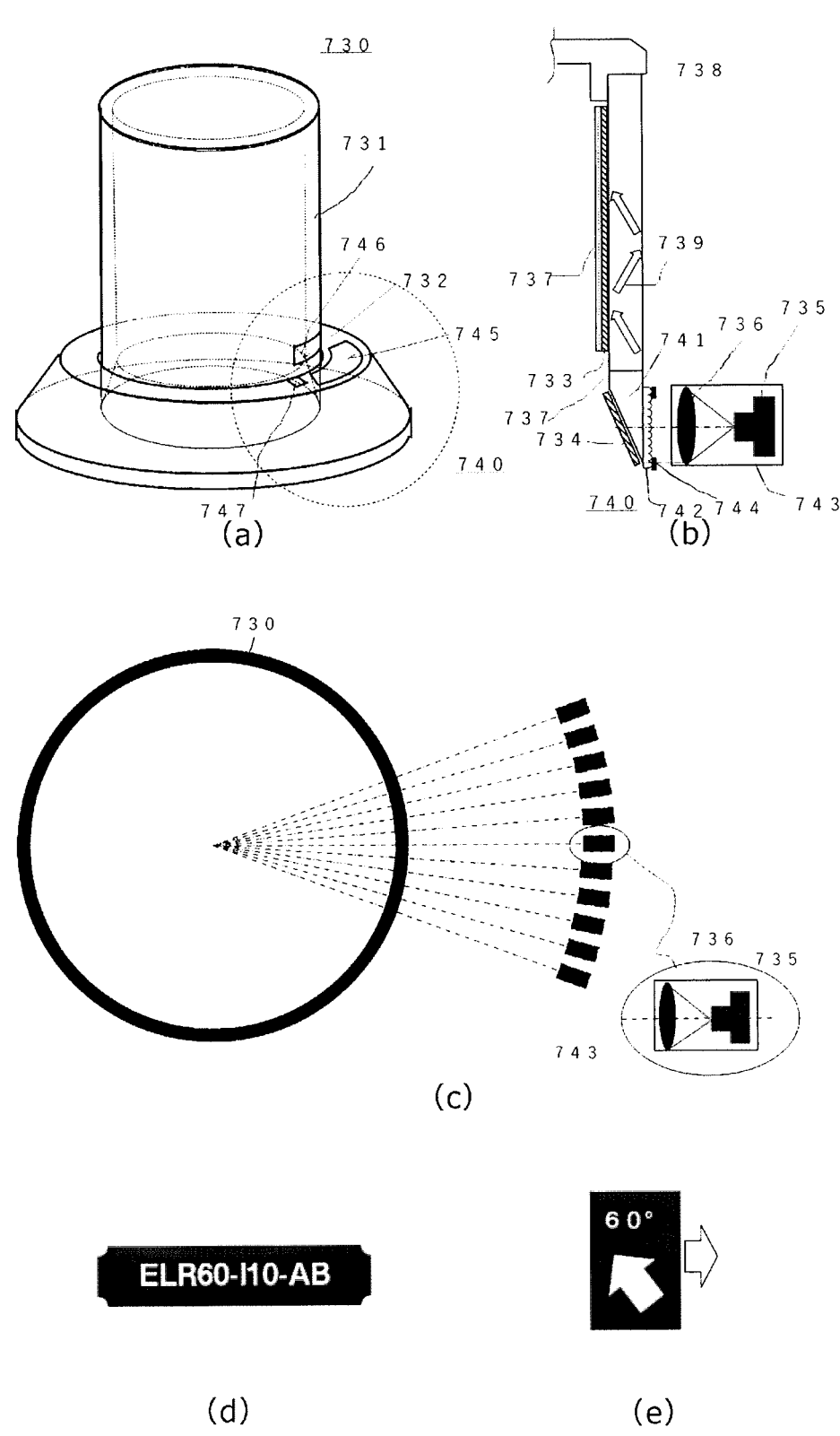
Figure 20:
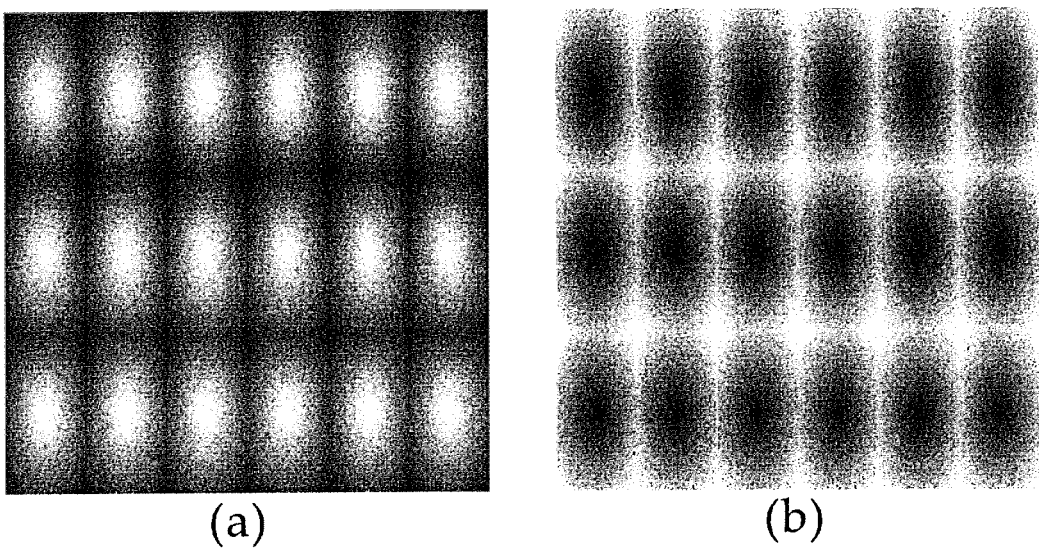
Figure 21:
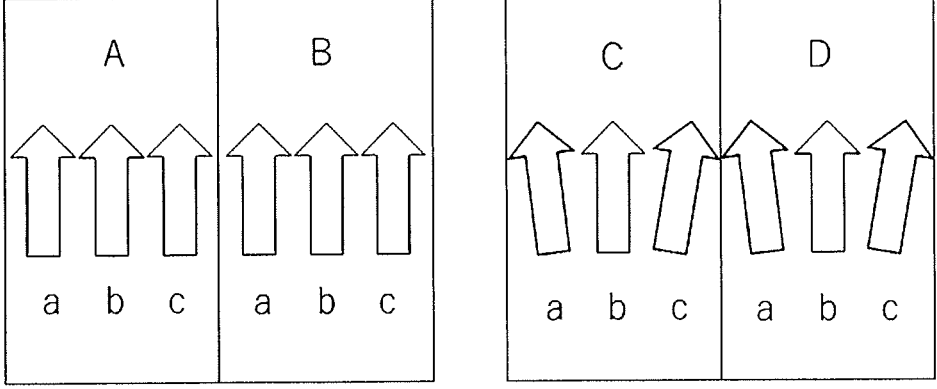
Figure 22:
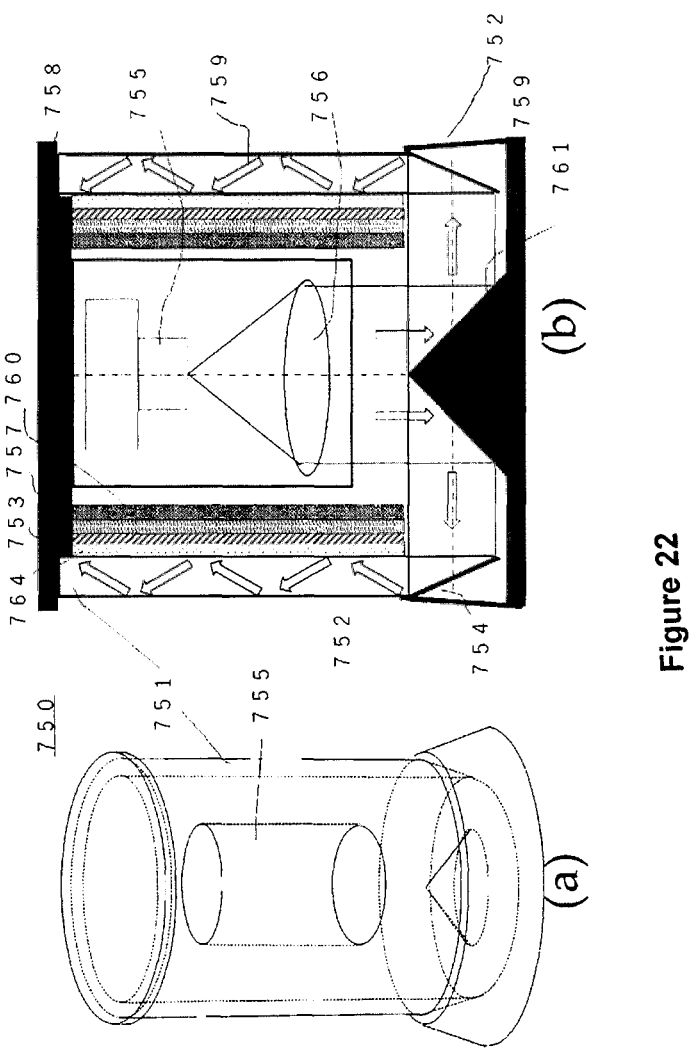

EXPLANATION OF NOTATIONS 101, 201, 801 - - - transparent substrate
102, 202 - - - recording medium for image hologram
103, 203, 803 - - - medium for reflection holographic diffraction grating
104, 204, 804 - - - holographic diffraction grating
105, 205, 805 - - - LED
106 - - - LED substrate
LA, LB, LC, LD, LE, LF - - - LED
HA, HB, HC, HD, HE, HF - - - holographic diffraction grating
700, 710, 730, 750 - - - cylindrical hologram display
701, 711, 731, 751 - - - cylinder
704, 715, 735, 755 - - - light source
761 - - - conical mirror

The invention claimed is:

1. An optical deflection device, comprising:
a plurality of light sources of SMD type LEDs arrayed and wired on a substrate in a form of a tape,
a transparent medium consisting of a parallel flat plate with optical refractive index of at least 1.3 or greater,
a plurality of holographic diffraction gratings placed on a part of the same surface of the transparent medium without an air gap between the holographic diffraction gratings and the transparent medium and arranged without interposition of any gap between adjacent holographic diffraction gratings in a direction perpendicular to a light-guiding direction of the parallel light in the transparent medium,
a spacer interposed between the transparent medium and the substrate, configured to position each light source of LEDs to face center of each holographic diffraction grating in proximity maintaining a specified distance, and
barrier walls of light absorbing material placed between neighboring holographic diffraction gratings in a manner which prevents incidence of light from the light sources into the neighboring diffraction gratings, wherein each light source is positioned to face each of the holographic diffraction gratings and has a same angle of divergence and same emission wavelength components, each holographic diffraction grating deflects a diverging light incident from each light source into parallel light at a specified angle in excess of a critical angle of the transparent medium, causing it to propagate within the transparent medium, and a surface of the substrate on which the LEDs are arrayed is parallel to and faces a surface perpendicular to a thickness direction of the parallel flat plate for light emitting locus of the LEDs to be away from a surface in the thickness direction of the parallel flat plate.

2. The optical deflection device as described in claim 1, wherein each holographic diffraction grating is imparted with an optical function of diffusing light, not in the direction perpendicular to, but only along, the propagation direction of the parallel light propagating inside the transparent medium.

3. The optical deflection device as described in claim 1, wherein an optical path of the parallel light includes an optical functional element placed therein which does not have a diffusing function in a direction perpendicular to, but only along, a propagation direction of the parallel light propagating inside the transparent medium.

4. The optical deflection device as described in claim 1, wherein a length y of the parallel light deflected by the holographic diffraction grating in the propagation direction is defined by an equation $y = 2t \times \tan\theta$, where $\theta$ is a propagation angle of the parallel light relative to a normal surface of the transparent medium, and t is the thickness of the transparent medium.

5. An image reproduction method for viewing a hologram image, comprising:

attaching, without interposition of an air gap, an edge-lit hologram produced by a separate process on to the face of a transparent medium of optical refractive index 1.3 or greater that is a thin cylinder or a partial thin cylinder with curvature, illuminating with at least two light sources and holographic diffraction gratings or refractive optical functional elements facing each light source and barrier walls of light absorbing material placed in a manner which prevents incidence of light from the light sources into neighboring holographic diffraction gratings or refractive optical functional elements, using the holographic diffraction gratings or refractive optical functional elements to make light from the light sources to be incident to the transparent medium at an angle in excess of a critical angle of the transparent medium, and making the edge-lit hologram to be illuminated by light propagating inside the transparent medium to reproduce a hologram image, wherein the light sources are SMD type LEDs arrayed and wired on a substrate in the form of a tape, a surface of the substrate on which the LEDs are arrayed is parallel to and faces a surface perpendicular to a thickness direction of the cylinder for the light emitting locus of the LED is to be away from a face of the cylinder in the thickness direction of the cylinder, a spacer allows each of all light sources of LEDs to face the center of each of the holographic diffraction gratings or the refractive optical functional elements in proximity maintaining a specified distance, and the spacer being placed between the transparent medium and the substrate arrayed the light sources, and a length y of the parallel light deflected by the holographic diffraction grating in the propagation direction is defined by an equation $y = 2t \times \tan\theta$, where $\theta$ is a propagation angle of the parallel light relative to a normal surface of the transparent medium, and t is the thickness of the transparent medium.

\* \* \* \* \*